US011576038B2

(12) United States Patent
Pan et al.

(10) Patent No.: US 11,576,038 B2
(45) Date of Patent: Feb. 7, 2023

(54) KEY GENERATION METHOD, APPARATUS, AND SYSTEM

(71) Applicant: HUAWEI TECHNOLOGIES CO., LTD., Shenzhen (CN)

(72) Inventors: Kai Pan, Shanghai (CN); Jing Chen, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 260 days.

(21) Appl. No.: 16/856,613

(22) Filed: Apr. 23, 2020

(65) Prior Publication Data

US 2020/0252795 A1 Aug. 6, 2020

Related U.S. Application Data

(63) Continuation of application No. PCT/CN2018/111256, filed on Oct. 22, 2018.

(30) Foreign Application Priority Data

Oct. 23, 2017 (CN) .......................... 201710996047.1

(51) Int. Cl.
*H04W 12/041* (2021.01)
*H04W 4/70* (2018.01)
(Continued)

(52) U.S. Cl.
CPC ......... *H04W 12/041* (2021.01); *H04L 9/0869* (2013.01); *H04W 4/70* (2018.02);
(Continued)

(58) Field of Classification Search
CPC ............. H04W 12/04; H04W 36/0038; H04W 12/041; H04W 4/70; H04W 12/106;
(Continued)

(56) References Cited

U.S. PATENT DOCUMENTS

2010/0130207 A1 5/2010 Wu
2013/0195268 A1* 8/2013 Norrman ........... H04W 36/0038
380/247
(Continued)

FOREIGN PATENT DOCUMENTS

CN 101600205 A 12/2009
CN 102395130 A 3/2012
(Continued)

OTHER PUBLICATIONS

NOKIA: "Handover from 5GS to EPC using N26",3GPP Draft; S3-172438,Oct. 2, 2017 (Oct. 2, 2017), XP051361097,total 3 pages.
(Continued)

*Primary Examiner* — Allahyar Kasraian
(74) *Attorney, Agent, or Firm* — Hauptman Ham, LLP

(57) ABSTRACT

A method includes receiving, by a mobility management entity (MME), a redirection request message from an access and mobility management function (AMF) node, where the redirection request message includes key-related information. The method also includes generating, by the MME, an encryption key and an integrity protection key based on the key-related information. The redirection request message is used to request to hand over a voice service from a packet switched (PS) domain to a circuit switched (CS) domain.

25 Claims, 10 Drawing Sheets

(51) Int. Cl.
*H04L 9/08* (2006.01)
*H04W 8/02* (2009.01)
*H04W 36/00* (2009.01)
*H04W 12/106* (2021.01)
*H04W 12/0433* (2021.01)

(52) U.S. Cl.
CPC ......... *H04W 8/02* (2013.01); *H04W 12/0433* (2021.01); *H04W 12/106* (2021.01); *H04W 36/0022* (2013.01); *H04L 2209/80* (2013.01)

(58) Field of Classification Search
CPC ......... H04W 12/0433; H04W 12/0431; H04W 36/0022; H04W 12/062; H04W 36/0066; H04W 8/02; H04W 12/10; H04W 8/08; H04W 12/043; H04W 12/0471; H04W 12/60; H04L 9/0869; H04L 2209/80; H04L 9/0861; H04L 9/0816; H04L 9/0891; H04L 9/14; H04L 9/08; H04L 9/0822; H04L 9/0838; H04L 9/16; H04L 9/085
See application file for complete search history.

(56) References Cited

U.S. PATENT DOCUMENTS

| | | | |
|---|---|---|---|
| 2014/0080449 A1 | 3/2014 | Chen et al. | |
| 2016/0183156 A1* | 6/2016 | Chin | H04W 36/38 370/331 |
| 2019/0082325 A1* | 3/2019 | Muhanna | H04W 12/10 |
| 2019/0124561 A1* | 4/2019 | Faccin | H04W 8/02 |
| 2020/0008054 A1* | 1/2020 | Wifvesson | H04L 9/0861 |
| 2020/0015079 A1* | 1/2020 | Li | H04W 8/08 |
| 2020/0329404 A1* | 10/2020 | Vikberg | H04L 65/1016 |

FOREIGN PATENT DOCUMENTS

| | | |
|---|---|---|
| CN | 102790965 A | 11/2012 |
| CN | 102905267 A | 1/2013 |
| CN | 103476028 A | 12/2013 |
| CN | 104010305 A | 8/2014 |
| CN | 110351724 A | 10/2019 |
| EP | 2192804 A1 | 6/2010 |
| RU | 2630175 C2 | 9/2017 |
| RU | 2644386 C1 * | 2/2018 ............ H04W 12/04 |
| WO | WO-2013113647 A1 * | 8/2013 ............ H04W 12/04 |
| WO | 2014039539 A1 | 3/2014 |
| WO | 2015196366 A1 | 12/2015 |
| WO | 2016007911 A1 | 1/2016 |
| WO | 2016134536 A1 | 9/2016 |
| WO | 2016160256 A1 | 10/2016 |
| WO | 2016166529 A1 | 10/2016 |

OTHER PUBLICATIONS

3GPP TR 24.890 V1.0.1 (Sep. 2017), 3rd Generation Partnership Project; Technical Specification Group Core Network and Terminals; 5G System Phase 1; CT WG1 Aspects (Release 15), Sep. 2017. total 162 pages.

3GPP TS 23.216 V15.0 0 (Sep. 2017);3rd Generation Partnership Project Technical Specification Group Services and System Aspects;Single Radio Voice Call Continuity (SRVCC);Stage 2(Release 15);total 69 pages.

3GPP Draft; 33501-030,:"3rd Generation Partnership Project; Technical Specification Group Services and System Aspects; Security Architecture and Procedures for 5G System (Release 15)",Sep. 27, 2017 (Sep. 27, 2017), XP051361244, total 44 pages.

Huawei et al.,"Adding EN to declar the ambiguity of AMF in TR33.899",3GPP TSG SA WG3 (Security) Meeting #86Bis S3-170905, Mar. 27-31, 2017, Busan, Korea, total 2 pages.

3GPP TS 33.401 V15.1.0 (Sep. 2017);3rd Generation Partnership Project;Technical Specification Group Services and System Aspects;3GPP System Architecture Evolution (SAE);Security architecture(Release 15);total 161 pages.

3GPP TR 33.856 V1.1.0,: 3rd Generation Partnership Project; Technical Specification Group Services and System Aspects; Study on security aspects of single radio voice continuity from 5G to UTRAN (Release 15) ,Oct. 4, 2018 (Oct. 4, 2018),pp. 1-15, XP051487606,total 15 pages.

Huawei et al: A proposal for the key derivation during SRVCC from 5G to 3Gwithout direct interface between AMF and MSC server of TR 33.856 ,3GPP Draft; S3-181585,Apr. 20, 2018 (Apr. 20, 2018), XP051433283,total 3 pages.

NEC, pCR to TR 33.899: Solution for key issue #13.1 3GPP TSG SA WG3 (Security) Meeting #88, Aug. 7-11, 2017, Dali, China, S3-172048, 4 pages.

Huawei, Hisilicon, TAU procedures in E-UTRAN during interworking from 5GC to EPC. 3GPP TSG SA WG3 (Security) Meeting #88Bis, 9 Oct. 13, 2017, Singapore, Singapore, S3-172266, 2 pages.

Ericsson, Key issue for inter-working handover between 5G Next Gen and Epc. 3GPP TSG SA WG3 (Security) Meeting #86-Bis, Mar. 27-31, 2017, Busan (South Korea), S3-170790, 3 pages.

Nokia, Solution on 5G key identification. 3GPP TSG SA WG3 (Security) Adhoc Meeting on FS_NSA, 27 Sep. 29, 2016, San Diego, USA, S3-161393, 2 pages.

Chinese Office Action issued in corresponding Chinese Application No. 202010796240.2, dated Apr. 2, 2021, pp. 1-9.

* cited by examiner

KEY GENERATION METHOD, APPARATUS, AND SYSTEM

CROSS-REFERENCE TO RELATED APPLICATIONS

This application is a continuation of International Application No. PCT/CN2018/111256, filed on Oct. 22, 2018, which claims priority to Chinese Patent Application No. 201710996047.1, on Oct. 23, 2017. The disclosures of the aforementioned applications are hereby incorporated by reference in their entireties.

TECHNICAL FIELD

This application relates to the field of wireless communications technologies, and in particular, to a key generation method, an apparatus, and a system.

BACKGROUND

Single radio voice call continuity (SRVCC) is a solution for implementing voice service continuity in a long term evolution (LTE) network. To prevent a terminal that is performing a voice service from encountering voice service interruption after the terminal moves out of a coverage area of the LTE network, the SRVCC solution may be used for handing over the voice service from a packet switched (PS) domain to a circuit switched (CS) domain, to ensure that the voice service is not interrupted.

In a next-generation communications network, for example, a 5th generation (5G) network, to prevent a terminal that is performing a voice service from encountering voice service interruption after the terminal moves out of a coverage area of the 5G network, the SRVCC solution may also be used for handing over the voice service from a PS domain to a CS domain. In a voice service handover process, an access and mobility management function (AMF) node sends a handover request to an MME, and the MME further generates an encryption key and an integrity protection key. However, before the voice service handover process, the MME does not serve the terminal that needs to perform a voice service handover in the 5G network. Therefore, the MME does not have a non-access stratum security context of the terminal. That is, the MME does not have a downlink non-access stratum count used for generating an encryption key and an integrity protection key. Consequently, the MME cannot generate an encryption key or an integrity protection key, thereby failing to implement security protection for the voice service.

SUMMARY

Embodiments of this application provide a key generation method, an apparatus, and a system, to resolve a problem that security protection for a voice service cannot be implemented in a process of handing over the voice service from a PS domain to a CS domain after a terminal that is performing the voice service moves out of a 5G network.

According to a first aspect, an embodiment of this application provides a key generation method. The method includes: receiving, by a mobility management entity MME, a redirection request message from an access and mobility management function AMF node, where the redirection request message includes key-related information; and generating, by the MME, an encryption key and an integrity protection key based on the key-related information. The redirection request message is used to request to hand over a voice service from a packet switched PS domain to a circuit switched CS domain. In the solution of this embodiment of this application, the AMF node adds the key-related information to the redirection request message sent to the MME, and the MME may further generate the encryption key and the integrity protection key based on the key-related information. Further, in a voice service handover process, the encryption key and the integrity protection key may be used to perform security protection for the voice service, thereby improving security.

In some embodiments, the key-related information includes an anchor key. A method for generating, by the MME, the encryption key and the integrity protection key based on the key-related information includes: determining, by the MME, one part of the anchor key as the encryption key, and determining the other part of the anchor key as the integrity protection key. By using the method, the MME may directly determine the encryption key and the integrity protection key based on the anchor key. In this way, security protection for the voice service can be implemented without obtaining a downlink non-access stratum count, and the implementation is simple.

In some embodiments, the anchor key includes 256 bits. The MME may determine the first 128 bits of the anchor key as the encryption key, and determine the last 128 bits of the anchor key as the integrity protection key; or determine the last 128 bits of the anchor key as the encryption key, and determine the first 128 bits of the anchor key as the integrity protection key.

In some embodiments, the key-related information includes an anchor key and a downlink non-access stratum count. A method for generating, by the MME, the encryption key and the integrity protection key based on the key-related information includes: generating, by the MME, the encryption key and the integrity protection key based on the anchor key and the downlink non-access stratum count. By using the method, the AMF node may send the downlink non-access stratum count to the MME, and the MME may further generate the encryption key and the integrity protection key based on the anchor key and the downlink non-access stratum count, thereby implementing security protection for the voice service.

The MME may generate a new key ($K_{ASME1}'$) based on the anchor key ($K_{ASME}$) and the downlink non-access stratum count, and further use a part of $K_{ASME1}'$ as the encryption key, and use the other part of $K_{ASME1}'$ as the integrity protection key.

Optionally, the MME first performs an operation on the downlink non-access stratum count to obtain an input parameter, generates a new key ($K_{ASME2}'$) by using the input parameter and the anchor key, and further uses a part of $K_{ASME2}'$ as the encryption key, and uses the other part of $K_{ASME2}'$ as the integrity protection key.

In some embodiments, the MME may send first instruction information to the AMF node. The first instruction information is used to instruct a terminal to generate an encryption key and an integrity protection key based on the downlink non-access stratum count.

In some embodiments, the key-related information includes an anchor key and a preset value, or the key-related information includes an anchor key and a random number. A method for generating, by the MME, the encryption key and the integrity protection key based on the key-related information includes: generating, by the MME, the encryption key and the integrity protection key based on the anchor key and the preset value; or generating, by the MME, the encryption key and the integrity protection key based on the anchor key and the random number. By using the method, the MME may generate the encryption key and the integrity protection key based on the anchor key and the preset value or the random number that is generated by the AMF node, thereby implementing security protection for the voice service. Because the MME receives no downlink non-access stratum count, even if the MME is cracked by an attacker, a root key of the AMF node cannot be reversely deduced based on the anchor key, thereby ensuring security of the AMF node.

The MME may use the preset value or the random number as an input parameter for generating a new key. Optionally, the MME generates a new key ($K_{ASME}'$) based on the anchor key and the preset value (or based on the anchor key and the random number), and further uses a part of $K_{ASME}'$ as the encryption key, and uses the other part of $K_{ASME}'$ as the integrity protection key.

In some embodiments, the key-related information includes an anchor key. A method for generating, by the MME, the encryption key and the integrity protection key based on the key-related information includes: generating, by the MME, the encryption key and the integrity protection key based on the anchor key and a preset value; or generating, by the MME, the encryption key and the integrity protection key based on the anchor key and a random number.

In some embodiments, the MME may send second instruction information to the AMF node. The second instruction information includes the preset value or the random number. The second instruction information is used to instruct a terminal to generate an encryption key and an integrity protection key based on the preset value or the random number. By using the method, the MME may generate the encryption key and the integrity protection key based on the anchor key and the preset value or the random number that is generated by the MME, thereby implementing security protection for the voice service. Because the MME receives no downlink non-access stratum count, even if the MME is cracked by an attacker, a root key of the AMF node cannot be reversely deduced based on the anchor key, thereby ensuring security of the AMF node.

According to a second aspect, an embodiment of this application provides a key generation method. The method includes: determining, by an access and mobility management function AMF node, key-related information, where the key-related information is used for generating an encryption key and an integrity protection key; and sending, by the AMF node, a redirection request message to a mobility management entity MME, where the redirection request message includes the key-related information, and the redirection request message is used to request to hand over a voice service from a packet switched PS domain to a circuit switched CS domain. By using the method, the AMF node adds the key-related information to the redirection request message sent to the MME. This avoids a case in which the MME cannot generate an encryption key or an integrity protection key due to a lack of a certain parameter, thereby improving security.

In some embodiments, the key-related information includes an anchor key and a downlink non-access stratum count. The AMF node may send first instruction information to a terminal. The first instruction information is used to instruct the terminal to generate an encryption key and an integrity protection key based on the downlink non-access stratum count.

In a possible implementation, before the AMF node sends the first instruction information to the terminal, the AMF node may generate the first instruction information, or the AMF node receives the first instruction information from the MME.

In some embodiments, the key-related information includes an anchor key. The AMF node may receive second instruction information from the MME, where the second instruction information includes a preset value or a random number, and the second instruction information is used to instruct a terminal to generate an encryption key and an integrity protection key based on the preset value or the random number; and then the AMF node sends the second instruction information to the terminal.

In some embodiments, the key-related information includes an anchor key and a preset value, or the key-related information includes an anchor key and a random number. The AMF node may send third instruction information to a terminal. The third instruction information includes the preset value or the random number. The third instruction information is used to instruct the terminal to generate an encryption key and an integrity protection key based on the preset value or the random number.

According to a third aspect, an embodiment of this application provides a key generation method. The method includes: receiving, by a terminal, a downlink non-access stratum count; generating, by the terminal, an anchor key based on a root key of an access and mobility management function AMF node and the downlink non-access stratum count; and determining, by the terminal, one part of the anchor key as an encryption key, and determining the other part of the anchor key as an integrity protection key. The terminal may negotiate with an MME in advance on a method for generating the encryption key and the integrity protection key. In this case, by using the method, the terminal may generate a same encryption key and integrity protection key as the MME, so that the terminal may decrypt data received from a network side, thereby implementing security protection for a voice service.

According to a fourth aspect, an embodiment of this application provides a key generation method. The method includes: receiving, by a terminal, a downlink non-access stratum count and first instruction information, where the first instruction information is used to instruct the terminal to generate an encryption key and an integrity protection key based on the downlink non-access stratum count; generating, by the terminal, an anchor key based on a root key of an access and mobility management function AMF node and the downlink non-access stratum count; and generating, by the terminal, the encryption key and the integrity protection key based on the anchor key and the downlink non-access stratum count. By using the method, the terminal may determine, based on the first instruction information, a method for generating the encryption key and the integrity protection key. Further, the terminal may generate a same encryption key and integrity protection key as an MME based on the first instruction information, so that the terminal may decrypt data received from a network side, thereby implementing security protection for a voice service.

According to a fifth aspect, an embodiment of this application provides a key generation method. The method includes: receiving, by a terminal, a downlink non-access stratum count and second instruction information, where the second instruction information includes a preset value or a random number, and the second instruction information is used to instruct the terminal to generate an encryption key and an integrity protection key based on the preset value or the random number; generating, by the terminal, an anchor key based on a root key of an access and mobility management function AMF node and the downlink non-access stratum count; and generating, by the terminal, the encryption key and the integrity protection key based on the anchor key and the preset value; or generating, by the terminal, the encryption key and the integrity protection key based on the anchor key and the random number. By using the method, the terminal may determine, based on the second instruction information, a method for generating the encryption key and the integrity protection key. Further, the terminal may generate a same encryption key and integrity protection key as an MME based on the second instruction information, so that the terminal may decrypt data received from a network side, thereby implementing security protection for a voice service.

According to a sixth aspect, an embodiment of this application provides a key generation method. The method includes: generating, by an AMF node, an encryption key and an integrity protection key based on key-related information; and sending, by the AMF node, a redirection request message to an MME, where the redirection request message includes the encryption key and the integrity protection key, and the redirection request message is used to request to hand over a voice service from a packet switched PS domain to a circuit switched CS domain. Compared with the prior art in which an MME cannot generate an encryption key or an integrity protection key due to a lack of a certain parameter, in this embodiment of this application, by using the method, the AMF node may generate the encryption key and the integrity protection key, and further send the encryption key and the integrity protection key to the MME. The MME does not need to generate an encryption key or an integrity protection key, but may directly use the received encryption key and integrity protection key, thereby implementing security protection for the voice service.

In some embodiments, the key-related information includes an anchor key. A method for generating, by the AMF node, the encryption key and the integrity protection key based on the key-related information includes: generating, by the AMF node, the anchor key based on a root key of the AMF node and a downlink non-access stratum count; and determining, by the AMF node, one part of the anchor key as the encryption key, and determining the other part of the anchor key as the integrity protection key.

In some embodiments, the key-related information includes an anchor key and a downlink non-access stratum count. A method for generating, by the AMF node, the encryption key and the integrity protection key based on the key-related information includes: generating, by the AMF node, the anchor key based on a root key of the AMF node and the downlink non-access stratum count; and generating, by the AMF node, the encryption key and the integrity protection key based on the anchor key and the downlink non-access stratum count.

In some embodiments, the AMF node may send first instruction information to a terminal. The first instruction information is used to instruct the terminal to generate an encryption key and an integrity protection key based on the downlink non-access stratum count.

In some embodiments, the key-related information includes an anchor key and a preset value, or the key-related information includes an anchor key and a random number. A method for generating, by the AMF node, the encryption key and the integrity protection key based on the key-related information includes: generating, by the AMF node, the anchor key based on a root key of the AMF node and a downlink non-access stratum count; and generating, by the AMF node, the encryption key and the integrity protection key based on the anchor key and the preset value; or generating, by the AMF node, the encryption key and the integrity protection key based on the anchor key and the random number.

In some embodiments, the AMF node may send third instruction information to a terminal. The third instruction information includes a preset value or a random number. The third instruction information is used to instruct the terminal to generate an encryption key and an integrity protection key based on the preset value or the random number.

According to a seventh aspect, an embodiment of this application provides an apparatus. The apparatus has functions of implementing behavior of the MME in the foregoing method design. The functions may be implemented by hardware, or may be implemented by hardware executing corresponding software. The hardware or the software includes one or more modules corresponding to the foregoing functions. For example, the apparatus may be an MME, or may be a chip in an MME.

In some embodiments, the apparatus is an MME. The MME includes a processor. The processor is configured to support the MME in performing a corresponding function in the foregoing method. Further, the MME may further include a communications interface. The communications interface is configured to support the MME in communicating with an MSC server or an AMF node. Further, the MME may further include a memory. The memory is coupled with the processor. The memory stores a program instruction and data required by the MME.

According to an eighth aspect, an embodiment of this application provides an apparatus. The apparatus has functions of implementing behavior of the AMF node in the foregoing method designs. The functions may be implemented by hardware, or may be implemented by hardware executing corresponding software. The hardware or the software includes one or more modules corresponding to the foregoing functions. For example, the apparatus may be the AMF node, or may be a chip in the AMF node.

In some embodiments, the apparatus is an AMF node. The AMF node includes a processor. The processor is configured to support the AMF node in performing a corresponding function in the foregoing method. Further, the AMF node may include a communications interface. The communications interface is configured to support communication between the AMF node and an MME or a gNB. Further, the AMF node may include a memory. The memory is configured to couple to the processor, and store a program instruction and data for the AMF node.

According to a ninth aspect, an embodiment of this application provides an apparatus. The apparatus has functions of implementing behavior of the terminal in the foregoing method design. The functions may be implemented by hardware, or may be implemented by hardware executing corresponding software. The hardware or the software includes one or more modules corresponding to the foregoing functions. For example, the apparatus may be a terminal, or may be a chip in a terminal.

In some embodiments, the apparatus is a terminal, and the terminal includes a processor. The processor is configured to support the terminal in performing the corresponding function in the foregoing method. Further, the terminal may further include a transmitter and a receiver. The transmitter and the receiver are configured to support communication between the terminal and the gNB. Further, the terminal may further include a memory. The memory is configured to couple to the processor, and the memory stores a program instruction and data for the terminal.

According to a tenth aspect, an embodiment of this application provides a communications system. The system includes the AMF node, the MME, and the terminal in the foregoing aspects; or the system may include a gNB, an MSC server, and the AMF node, the MME, and the terminal in the foregoing aspects.

According to an eleventh aspect, an embodiment of this application provides a computer storage medium. The computer storage medium is configured to store a computer software instruction used by the foregoing MME. The computer software instruction includes a program designed to perform the first aspect.

According to a twelfth aspect, an embodiment of this application provides a computer storage medium. The computer storage medium is configured to store a computer software instruction used by the foregoing MME. The computer software instruction includes a program designed to perform the second aspect or the sixth aspect.

According to a thirteenth aspect, an embodiment of this application provides a computer storage medium, configured to store a computer software instruction used by the foregoing terminal. The computer software instruction includes a program designed to perform the third aspect, the fourth aspect, or the fifth aspect.

According to a fourteenth aspect, an embodiment of this application provides a computer program product including an instruction. When the computer program product runs on a computer, the computer is enabled to perform the method according to the first aspect.

According to a fifteenth aspect, an embodiment of this application provides a computer program product including an instruction. When the computer program product runs on a computer, the computer is enabled to perform the method according to the second aspect or the sixth aspect.

According to a sixteenth aspect, an embodiment of this application provides a computer program product including an instruction. When the computer program product runs on a computer, the computer is enabled to perform the method according to the third aspect, the fourth aspect, or the fifth aspect.

According to a seventeenth aspect, an embodiment of this application provides a chip system, applied to an MME. The chip system includes at least one processor, a memory, and a transceiver circuit. The memory, the transceiver circuit, and the at least one processor are connected to each other by using a line. The at least one memory stores an instruction. The instruction is executed by the processor, to perform the operations of the MME in the method according to the first aspect.

According to an eighteenth aspect, an embodiment of this application provides a chip system, applied to an AMF node. The chip system includes at least one processor, a memory, and a transceiver circuit. The memory, the transceiver circuit, and the at least one processor are connected to each other by using a line. The at least one memory stores an instruction. The instruction is executed by the processor, to perform the operations of the AMF node in the method according to the second aspect or the sixth aspect.

According to a nineteenth aspect, an embodiment of this application provides a chip system, applied to a terminal. The chip system includes at least one processor, a memory, and a transceiver. The memory, the transceiver, and the at least one processor are connected to each other by using a line. The at least one memory stores an instruction. The instruction is executed by the processor, to perform the operations of the terminal according to the third aspect, the fourth aspect, or the fifth aspect.

Compared with the prior art in which security protection for a voice service cannot be implemented because an MME cannot generate an encryption key or an integrity protection key due to a lack of a parameter for generating a user-plane encryption key and integrity protection key, the AMF node adds the key-related information to the redirection request message sent to the MME, and the MME may further generate the encryption key and the integrity protection key based on the key-related information. Further, in the voice service handover process, the encryption key and the integrity protection key may be used to perform security protection for the voice service, thereby improving security.

DESCRIPTION OF EMBODIMENTS

The following further describes in detail this application with reference to the accompanying drawings. A specific operation method in a method embodiment may also be applied to an apparatus embodiment or a system embodiment. In the description of this application, unless otherwise stated, "multiple" means two or more than two.

A system architecture and a service scenario that are described in this application are intended to describe the technical solutions of this application more clearly, but constitute no limitation on the technical solutions provided in this application. A person of ordinary skill in the art may know that, with evolution of the system architecture and emergence of new service scenarios, the technical solutions provided in this application are also applicable to similar technical problems.

Figure 1:
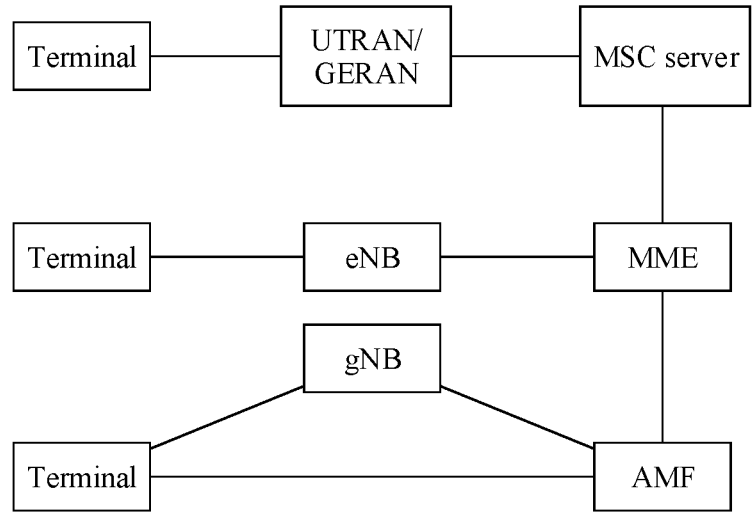
FIG. 1 is a schematic diagram of a possible network architecture according to an embodiment of this application.

FIG. 1 is a schematic diagram of a possible network architecture according to this application. The network architecture includes an AMF node and a radio access network node (for example, a next generation base station node (gNB)) in a 5G communications system, an MME and a radio access network node (for example, an evolved NodeB (eNB)) in a 4th generation (4G) communications system, a mobile switching center (MSC) server and a radio access network node (for example, an access network node of a universal mobile telecommunications system terrestrial radio access network (UMTS terrestrial radio access network, UTRAN) or an access network node of a GSM/EDGE radio access network (GERAN)) in a 2nd generation (2G) or 3rd generation (3G) communications system, and a terminal supporting 5G communication, 4G communication, 2G communication, and 3G communication.

It should be noted that a quantity of devices shown in FIG. 1 is not limited in this application. For example, FIG. 1 shows three terminals that wirelessly communicate with a radio access network node in a 2G or 3G communications system, an eNB in an LTE communications system, and a gNB in a 5G communications system respectively. Certainly, this application is not limited thereto. An access network may be determined for each terminal based on a network coverage status.

The terminal mentioned in this application is a device with a wireless sending/receiving function; and may be deployed on land, including an indoor, outdoor, handheld, or in-vehicle scenario, or may be deployed on water (for example, on a steamship), or may be deployed in the air (for example, on an airplane, a balloon, or a satellite). The terminal may include various types of devices, for example, user equipment (UE), a mobile phone, a tablet computer (pad), a computer with a wireless sending/receiving function, a virtual reality (VR) terminal device, an augmented reality (AR) terminal device, a machine type communication (MTC) terminal device, a terminal device in industrial control, a terminal device with a voice call function in remote medical, a terminal device with a voice call function in transportation safety, a terminal device with a voice call function in a smart city, and a wearable device (for example, a smart watch with a voice call function, and a smart band with a voice call function). For example, the terminal mentioned in the embodiments of this application may be a device with a wireless sending/receiving function and a voice call function.

The AMF node is a network element responsible for mobility management in the 5G communications system, and may be configured to implement functions, for example, lawful interception and access authorization, of MME functions other than session management. The AMF node in the embodiments of this application may be an AMF node with a security anchor function (SEAF), or may be a node without a SEAF function. A SEAF node may be disposed independently.

The MME is a network element responsible for mobility management in the 4G communications system, and is further configured to implement functions such as bearer management, user authentication, and selection of a serving gateway (SGW) and a packet data network gateway (PGW).

The MSC server has a call control and processing function. The MSC server in the embodiments of this application is an enhanced MSC server supporting SRVCC.

The radio access network nodes in 5G, 4G, 3G, and 2G each are a node that can provide a wireless communication function for a terminal.

The embodiments of this application are applied to an SRVCC scenario in 5G. Based on the schematic diagram of the network architecture shown in FIG. 1, in a process of performing a voice service by a terminal in the 5G communications system, if the terminal moves out of a coverage area of a 5G network, the voice service of the terminal may be handed over from a PS domain to a CS domain, to ensure that the voice service of the terminal is not interrupted. However, there is no direct communications interface between the 5G communications system and the 2G or 3G communications system. Therefore, the voice service needs to be handed over from the 5G communications system to the 4G communications system, and then handed over from the 4G communications system to the 2G or 3G communications system.

In the prior art, in a process of performing a voice service by a terminal in the 4G communications system, if the terminal moves out of a coverage area of a 4G network, the voice service of the terminal may be handed over from a PS domain to a CS domain, to ensure that the voice service of the terminal is not interrupted. In a handover process, the MME may generate an encryption key and an integrity protection key based on a downlink non-access stratum count (DL NAS count) maintained by the MME, and send the encryption key and the integrity protection key to the MSC server. Likewise, the terminal may generate an encryption key and an integrity protection key based on the same downlink non-access stratum count.

In a process of handing over a terminal from the 5G network to the 4G network and then to a 2G or 3G network, the AMF node in the 5G communications system may send a redirection request message to the MME in the 4G communications system, and the MME further generates an encryption key and an integrity protection key, and sends the generated encryption key and integrity protection key to the MSC server. However, in a voice service handover process, the AMF hands over a voice service of the terminal from the 5G network to the 2G or 3G network through the MME, and the terminal performing the voice service does not communicate with the MME before the handover process. Therefore, the MME does not store a same downlink non-access stratum count as the terminal does, that is, the MME lacks a certain parameter for generating an encryption key and an integrity key. Consequently, the MME cannot generate an encryption key or an integrity protection key, thereby failing to perform security protection for the voice service.

To resolve the foregoing problem, a solution provided in an embodiment of this application includes: sending, by an AMF node, a redirection request message to an MME, where the redirection request message includes key-related information; and generating, by the MME, an encryption key and an integrity protection key based on the key-related information. By using the solution, the AMF node sends, to the MME in a handover request, the key-related information used for generating the encryption key and the integrity protection key, and the MME may further generate the encryption key and the integrity protection key. This resolves a prior-art problem that security protection for a voice service cannot be performed because an MME cannot generate an encryption key or an integrity protection key.

The following describes in detail the technical solutions provided in this application.

Figure 2:
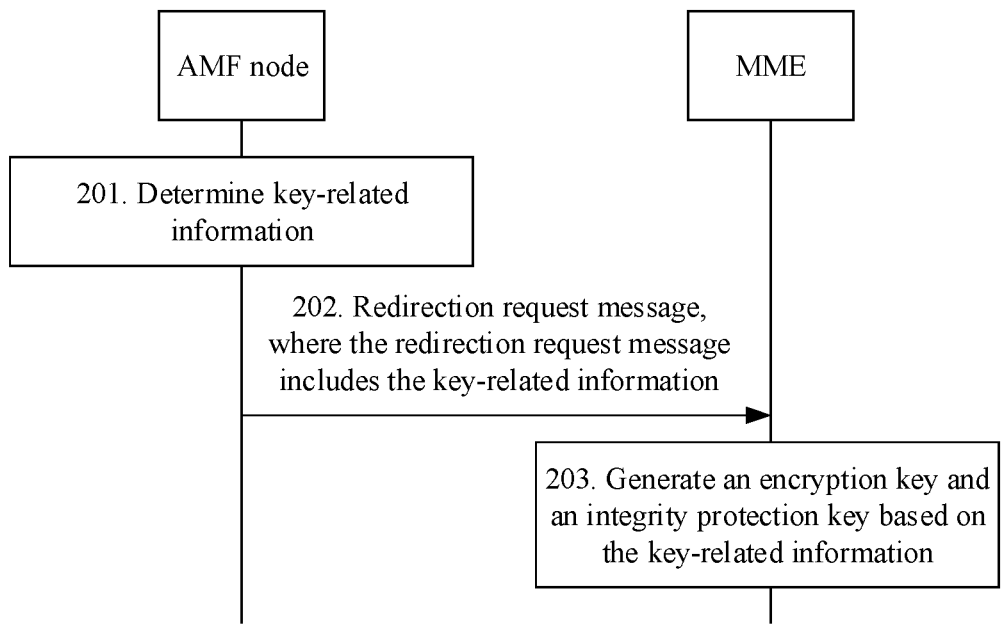
FIG. 2 is a schematic communication diagram of a key generation method according to an embodiment of this application.

FIG. 2 shows a key generation method provided in an embodiment of this application. The method includes step 201 to step 203.

Step 201. An AMF node determines key-related information.

The key-related information is information used for generating an encryption key and an integrity protection key.

The key-related information includes an anchor key. For example, the AMF node may generate the anchor key based on a root key of the AMF node and a downlink non-access stratum count.

In an example, the key-related information includes an anchor key and a downlink non-access stratum count.

It should be noted that the downlink non-access stratum count is the same as a downlink non-access stratum count used by the AMF node to generate the anchor key.

In another example, the key-related information includes an anchor key and a preset value, or the key-related information includes an anchor key and a random number.

The preset value may be a fixed value, or may not be a fixed value. For example, the preset value may be increased by 1 each time the AMF node sends a handover request to an MME. The random number included in the key-related information is a random number generated by the AMF node.

Step 202. The AMF node sends a redirection request message to the MME, where the redirection request message includes the key-related information. Correspondingly, the MME receives the key-related information.

The redirection request message is used to request to hand over a voice service from a PS domain to a CS domain. Optionally, the redirection request message further includes SRVCC instruction information. The SRVCC instruction information is used to instruct the MME to request, by sending a handover request message, to hand over the voice service from the PS domain to the CS domain.

Step 203. The MME generates an encryption key and an integrity protection key based on the key-related information.

Compared with the prior art in which security protection for a voice service cannot be implemented because an MME cannot generate an encryption key or an integrity protection key due to a lack of a parameter for generating a user-plane encryption key and integrity protection key, in the key generation method provided in this embodiment of this application, the AMF node adds the key-related information to the redirection request message sent to the MME, and the MME may further generate the encryption key and the integrity protection key based on the key-related information. Further, in a voice service handover process, the encryption key and the integrity protection key may be used to perform security protection for the voice service, thereby improving security.

It can be understood that there are a plurality of possibilities for content included in the key-related information determined by the AMF node in step 201. For each possibility, a method for generating, by the MME node, the encryption key and the integrity protection key based on the key-related information in step 203 also varies. With reference to four implementations provided in this embodiment of this application, the following describes four methods for generating, by the MME node, the encryption key and the integrity protection key based on the key-related information.

Figure 3:
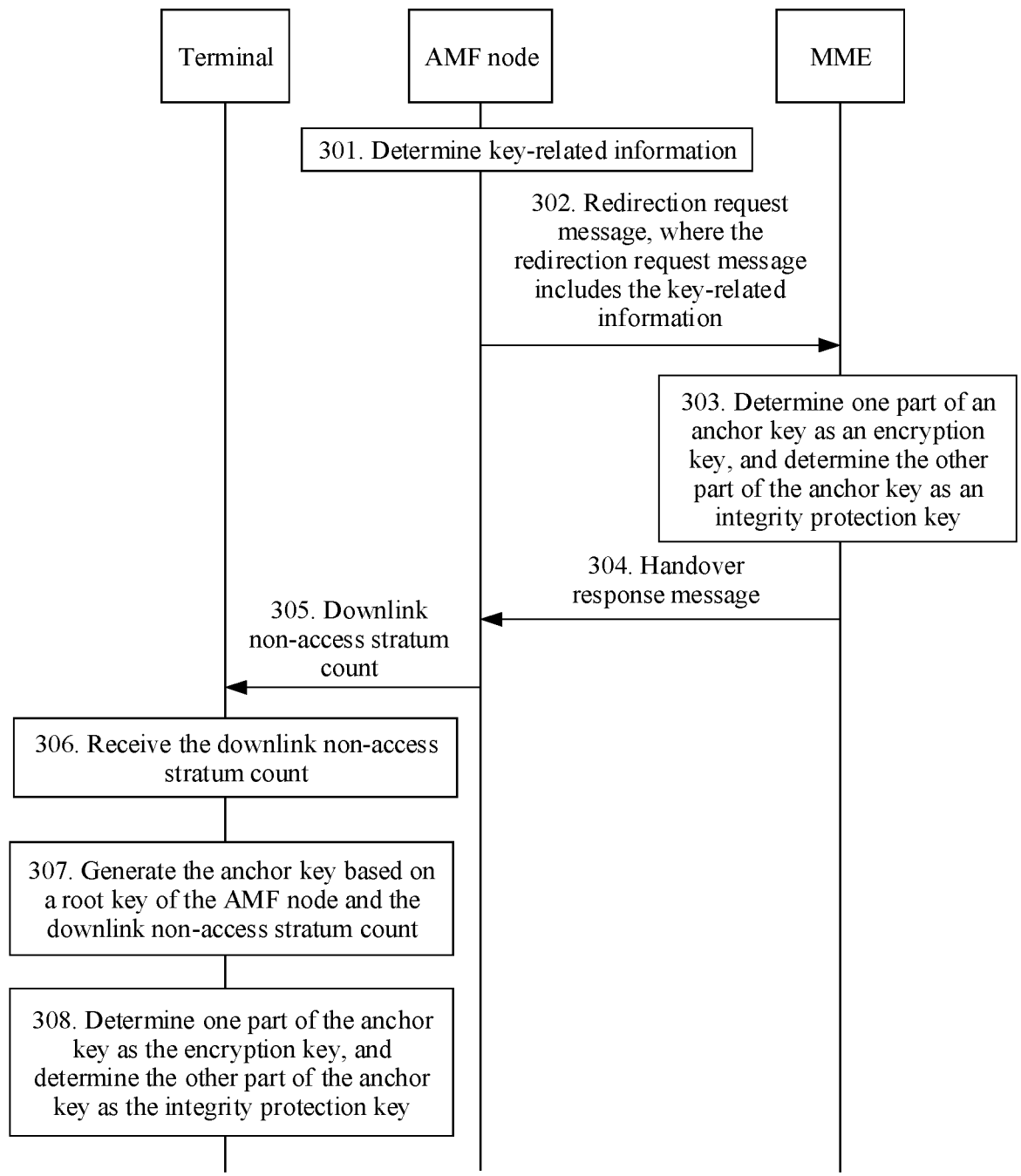
FIG. 3 is a schematic communication diagram of another key generation method according to an embodiment of this application.

In a first possible implementation, the key-related information includes an anchor key. As shown in FIG. 3, the method includes step 301 to step 308.

For steps 301 to 302, refer to related descriptions in steps 201 to 202. Certainly, this application is not limited thereto. The key-related information in step 301 and step 302 includes an anchor key.

Step 303. The MME determines one part of the anchor key as an encryption key, and determines the other part of the anchor key as an integrity protection key.

For example, the anchor key may include 256 bits. The MME may determine the first 128 bits of the anchor key as the encryption key, and determine the last 128 bits of the anchor key as the integrity protection key; or the MME determines the first 128 bits of the anchor key as the integrity protection key, and determines the last 128 bits of the anchor key as the encryption key. This is not limited in this embodiment of this application.

After the MME generates the encryption key and the integrity protection key, a terminal also needs to generate an encryption key and an integrity protection key. The encryption key and the integrity protection key generated by the terminal are the same as the encryption key and the integrity protection key generated by the MME. Based on this, after step 303, step 304 to step 308 may be performed.

Step 304. The MME sends a handover response message to the AMF node. Correspondingly, the AMF node receives the handover request message.

After generating the encryption key and the integrity protection key, the MME may send a handover request message to an MSC server based on SVRRC instruction information, and send the handover response message to the AMF node after receiving a handover response message from the MSC server, to trigger the AMF node to perform step 305.

Step 305. The AMF node sends a downlink non-access stratum count to the terminal.

Optionally, the AMF node may add the downlink non-access stratum count to a handover command. The AMF node sends the handover command to a gNB, and the gNB further forwards the handover command to the terminal.

It should be noted that the downlink non-access stratum count sent by the AMF node to the terminal in this embodiment of this application may be a complete downlink non-access stratum count; or to reduce overheads, the AMF node may send four least significant bits of a downlink non-access stratum count to the terminal, and the terminal may restore a complete downlink non-access stratum count after receiving the downlink non-access stratum count.

The downlink non-access stratum count is a 24-bit value. Sixteen most significant bits are overflow bits, and eight least significant bits are a sequence number. For example, the complete downlink non-access stratum count sent by the AMF node may be 0000000000000000 0011 1101. Alternatively, the AMF node sends only 1101, and the terminal may restore the complete downlink non-access stratum count 0000000000000000 0011 1101 after receiving the downlink non-access stratum count 1101.

Step 306. The terminal receives the downlink non-access stratum count.

Step 307. The terminal generates an anchor key based on a root key of the AMF node and the downlink non-access stratum count.

Step 308. The terminal determines one part of the anchor key as the encryption key, and determines the other part of the anchor key as the integrity protection key.

For example, the terminal may determine the first 128 bits of the anchor key as the encryption key, and determine the last 128 bits of the anchor key as the integrity protection key; or may determine the last 128 bits of the anchor key as the encryption key, and determine the first 128 bits of the anchor key as the integrity protection key. This is not limited in this application.

It should be noted that the terminal and the MME need to negotiate in advance on how to determine the encryption key and the integrity protection key based on the anchor key, to ensure that the encryption key and the integrity protection key determined by the terminal are the same as those determined by the MME.

By using the method, the MME may directly determine the encryption key and the integrity protection key based on the anchor key. In this way, security protection for the voice service can be implemented without obtaining a downlink non-access stratum count, and the implementation is simple.

Figure 4:
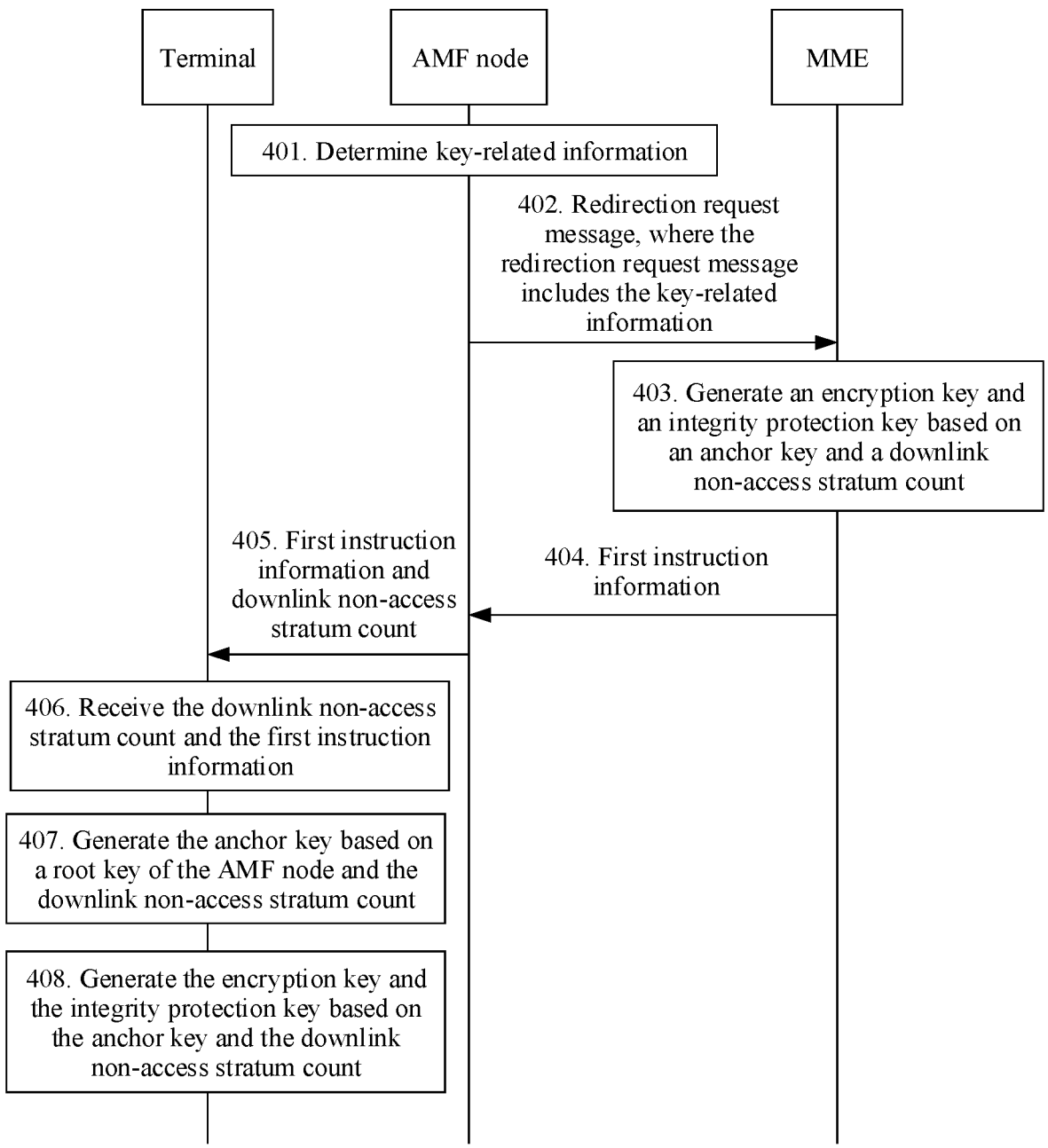
FIG. 4 is a schematic communication diagram of still another key generation method according to an embodiment of this application.

In a second possible implementation, the key-related information includes an anchor key and a downlink non-access stratum count. As shown in FIG. 4, the method includes step 401 to step 408.

For steps 401 to 402, refer to related descriptions in steps 201 to 202. Certainly, this application is not limited thereto. The key-related information in step 401 and step 402 includes an anchor key and a downlink non-access stratum count.

Step 403. The MME generates an encryption key and an integrity protection key based on the anchor key and the downlink non-access stratum count.

Optionally, the MME may generate a new key ($K_{ASME1}'$) based on the anchor key ($K_{ASME}$) and the downlink non-access stratum count, and further use a part of $K_{ASME1}'$ as the encryption key, and use the other part of $K_{ASME1}'$ as the integrity protection key. For example, $K_{ASME1}'$ may include 256 bits. The first 128 bits of $K_{ASME1}$ may be used as the encryption key, and the last 128 bits of $K_{ASME1}'$ may be used as the integrity protection key. This is not limited in this application.

Optionally, the MME does not directly use the received downlink non-access stratum count to generate the encryption key and the integrity protection key, but first performs an operation on the downlink non-access stratum count to obtain an input parameter, generates a new key ($K_{ASME2}'$) by using the input parameter and the anchor key, and further uses a part of $K_{ASME2}'$ as the encryption key, and uses the other part of $K_{ASME2}'$ as the integrity protection key. For example, $K_{ASME2}'$ may include 256 bits. The first 128 bits of $K_{ASME2}'$ may be used as the encryption key, and the last 128 bits of $K_{ASME2}'$ may be used as the integrity protection key.

Step 404. The MME sends first instruction information to the AMF node, where the first instruction information is used to instruct a terminal to generate an encryption key and an integrity protection key based on the downlink non-access stratum count. Correspondingly, the AMF node receives the first instruction information.

It should be noted that if the MME does not directly use the downlink non-access stratum count to generate the encryption key and the integrity protection key, but first performs the operation on the downlink non-access stratum count to obtain the input parameter, and further generates the encryption key and the integrity protection key based on the input parameter and the anchor key. In this case, the first instruction information sent by the MME may indicate a manner of obtaining, by the terminal, an input parameter based on the downlink non-access stratum count; and further, the encryption key and the integrity protection key are generated based on the input parameter and an anchor key.

Step 405. The AMF node sends first instruction information and the downlink non-access stratum count to the terminal.

Optionally, the first instruction information sent by the AMF node to the terminal may be first instruction information generated by the AMF node, or may be the first instruction information received from the MME. Step 404 does not need to be performed when the first instruction information is the first instruction information generated by the AMF node.

The AMF node may add the first instruction information to a handover command. Optionally, the handover command further includes the downlink non-access stratum count. The AMF node sends the handover command to a gNB, and the gNB further sends the handover command to the terminal.

Step 406. The terminal receives the downlink non-access stratum count and the first instruction information.

Step 407. The terminal generates the anchor key based on a root key of the AMF node and the downlink non-access stratum count.

Step 408. The terminal generates the encryption key and the integrity protection key based on the anchor key and the downlink non-access stratum count.

A method for generating, by the terminal, the encryption key and the integrity protection key based on the anchor key and the downlink non-access stratum count is the same as the method for generating, by the MME, the encryption key and the integrity protection key based on the anchor key and the downlink non-access stratum count in step 403. The terminal may generate a new key ($K_{ASME1}'$) based on the anchor key ($K_{ASME}$) and the downlink non-access stratum count, and further use a part of $K_{ASME1}'$ as the encryption key, and use the other part of $K_{ASME1}'$ as the integrity protection key. Alternatively, the terminal performs an operation on the downlink non-access stratum count based on the first instruction information to obtain an input parameter, generates a new key ($K_{ASME2}'$) by using the input parameter and the anchor key, and further uses a part of $K_{ASME2}'$ as the encryption key, and uses the other part of $K_{ASME2}'$ as the integrity protection key.

Figure 5:
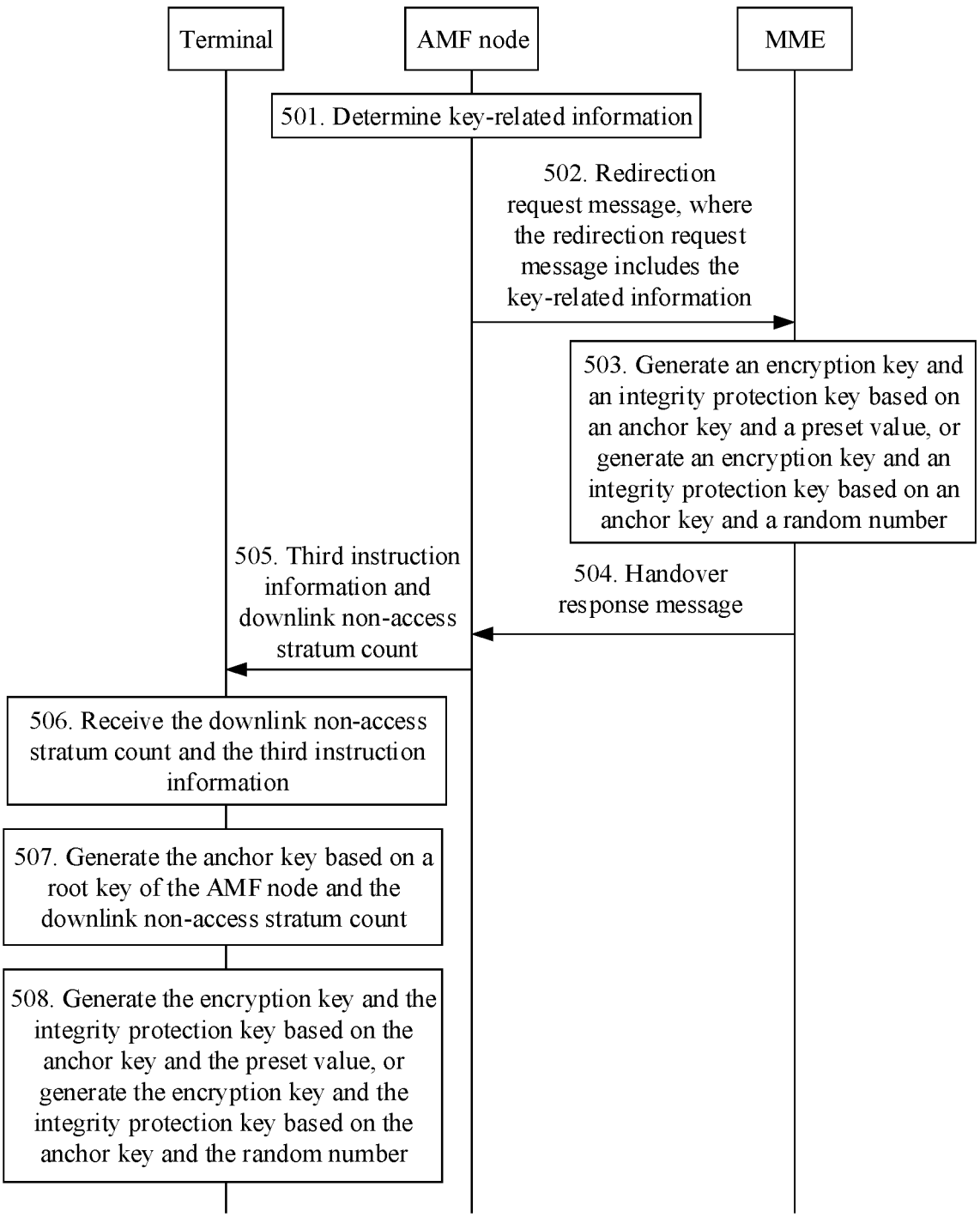
FIG. 5 is a schematic communication diagram of yet another key generation method according to an embodiment of this application.

Compared with the prior art in which an MME cannot generate an encryption key or an integrity protection key due to a lack of a downlink non-access stratum count, in this embodiment of this application, by using the method, the AMF node may send the downlink non-access stratum count to the MME, and the MME may further generate the encryption key and the integrity protection key based on the anchor key and the downlink non-access stratum count, thereby implementing security protection for the voice service In a third possible implementation, the key-related information includes an anchor key and a preset value, or the key-related information includes an anchor key and a random number. As shown in FIG. 5, the method includes step 501 to step 508.

For step 501 and step 502, refer to related descriptions in step 201 and step 202. Certainly, this application is not limited thereto. The key-related information in step 501 and step 502 includes an anchor key and a preset value, or includes an anchor key and a random number. The preset value or the random number in the key-related information is generated by the AMF node.

Step 503. The MME generates the encryption key and the integrity protection key based on the anchor key and the preset value, or the MME generates the encryption key and the integrity protection key based on the anchor key and the random number.

The MME may use the preset value or the random number as an input parameter for generating a new key. Optionally, the MME generates a new key ($K_{ASME}'$) based on the anchor key and the preset value (or based on the anchor key and the random number), and further uses a part of $K_{ASME}'$ as the encryption key, and uses the other part of $K_{ASME}'$ as the integrity protection key. For example, $K_{ASME}'$ may include 256 bits. The first 128 bits of $K_{ASME}'$ may be used as the encryption key, and the last 128 bits of $K_{ASME}'$ may be used as the integrity protection key; or the last 128 bits of $K_{ASME}'$ may be used as the encryption key, and the first 128 bits of $K_{ASME}'$ may be used as the integrity protection key. This is not limited in this embodiment of this application.

Step 504. The MME sends a handover response message to the AMF node. Correspondingly, the AMF node receives the handover response message.

After generating the encryption key and the integrity protection key, the MME may send a handover request message to an MSC server based on SVRRC instruction information, and send the handover response message to the AMF node after receiving a handover response message from the MSC server, to trigger the AMF node to perform step 505.

Step 505. The AMF node sends third instruction information and a downlink non-access stratum count to a terminal.

The third instruction information includes the preset value or the random number. The third instruction information is used to instruct the terminal to generate an encryption key and an integrity protection key based on the preset value or the random number.

Optionally, the AMF node adds the third instruction information to a handover command sent to the terminal. The handover command may further carry the downlink non-access stratum count. The AMF node sends the handover command to a gNB, and the gNB further forwards the handover command to the terminal.

Step 506. The terminal receives the downlink non-access stratum count and the third instruction information.

Step 507. The terminal generates an anchor key based on a root key of the AMF node and the downlink non-access stratum count.

Step 508. The terminal generates the encryption key and the integrity protection key based on the anchor key and the preset value, or the terminal generates the encryption key and the integrity protection key based on the anchor key and the random number.

If the MME generates the encryption key and the integrity protection key based on the anchor key and the preset value in step 503, the third instruction information includes the preset value. Correspondingly, the terminal generates the encryption key and the integrity protection key based on the anchor key and the preset value. A method for generating, by the terminal, the encryption key and the integrity protection key based on the anchor key and the preset value is the same as the method for generating, by the MME, the encryption key and the integrity protection key based on the anchor key and the preset value in step 503. Details are not described herein again.

If the MME generates the encryption key and the integrity protection key based on the anchor key and the random number in step 503, the third instruction information includes the random number. Correspondingly, the terminal generates the encryption key and the integrity protection key based on the anchor key and the random number. A method for generating, by the terminal, the encryption key and the integrity protection key based on the anchor key and the random number is the same as the method for generating, by the MME, the encryption key and the integrity protection key based on the anchor key and the random number in step 503. Details are not described herein again.

By using the method, the MME may generate the encryption key and the integrity protection key based on the anchor key and the preset value or the random number that is generated by the AMF node, thereby implementing security protection for the voice service. Because the MME receives no downlink non-access stratum count, even if the MME is cracked by an attacker, the root key of the AMF node cannot be reversely deduced based on the anchor key, thereby ensuring security of the AMF node.

Figure 6:
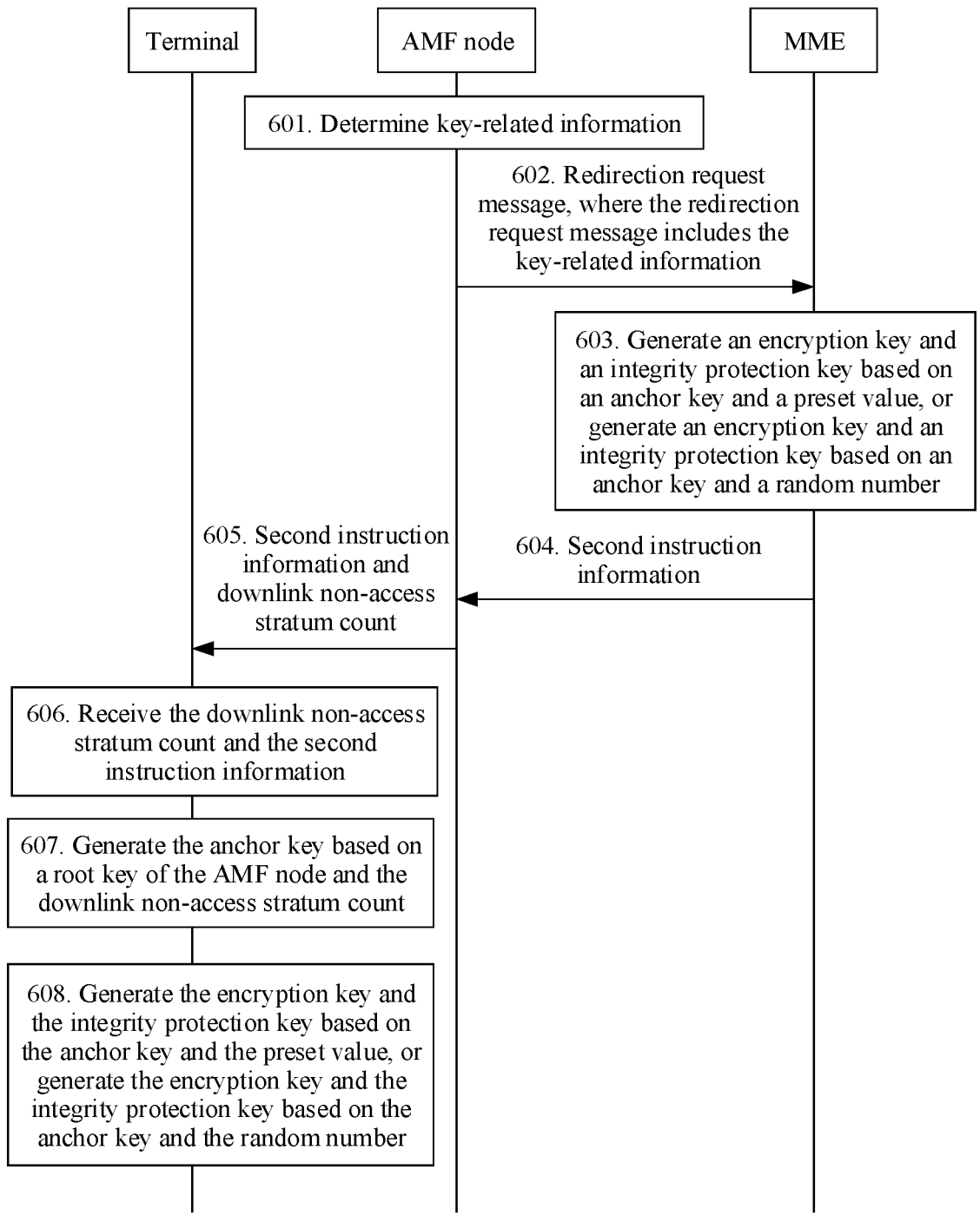
FIG. 6 is a schematic communication diagram of yet another key generation method according to an embodiment of this application.

In a fourth possible implementation, the key-related information includes an anchor key. A difference between the third implementation and the fourth implementation is as follows: In the third implementation, the preset value or the random number used by the MME and the terminal to generate the encryption key and the integrity protection key is generated by the AMF node; while in the fourth implementation, a preset value or a random number used by an MME and a terminal to generate an encryption key and an integrity protection key is generated by the MME. As shown in FIG. 6, the method includes step 601 to step 608.

For step 601 and step 602, refer to related descriptions in step 201 and step 202. Certainly, this application is not limited thereto. The key-related information in step 601 and step 602 includes an anchor key.

Step 603. The MME generates the encryption key and the integrity protection key based on the anchor key and a preset value, or the MME generates the encryption key and the integrity protection key based on the anchor key and a random number.

The preset value or the random number in step 603 is generated by the MME. It should be noted that a specific value of the preset value or the random number generated by the MME in the embodiment corresponding to FIG. 6 may be the same as or different from that of the preset value or the random number generated by the AMF node in the embodiment corresponding to FIG. 5. This is not limited in this application.

For a method for generating, by the MME, the encryption key and the integrity protection key based on the anchor key and the preset value (or based on the anchor key and the random number) in step 603, refer to related descriptions in step 503. Details are not described herein again.

Step 604. The MME sends second instruction information to the AMF node. Correspondingly, the AMF node receives the second instruction information.

The second instruction information includes the preset value or the random number. The second instruction information is used to instruct a terminal to generate an encryption key and an integrity protection key based on the preset value or the random number. The preset value in the second instruction information is a preset value in the MME. The random number in the second instruction information is a random number generated by the MME.

Step 605. The AMF node sends second instruction information and a downlink non-access stratum count to the terminal.

Optionally, the AMF node may add the second instruction information to a handover command sent to the terminal. The second instruction information may further include the downlink non-access stratum count. The AMF node sends the handover command to a gNB, and the gNB forwards the handover command to the terminal.

Step 606. The terminal receives the downlink non-access stratum count and the second instruction information.

Step 607. The terminal generates an anchor key based on a root key of the AMF node and the downlink non-access stratum count.

Step 608. The terminal generates the encryption key and the integrity protection key based on the anchor key and the preset value, or the terminal generates the encryption key and the integrity protection key based on the anchor key and the random number.

For a method for generating, by the terminal, the encryption key and the integrity protection key based on the anchor key and the preset value in step 608, refer to related descriptions in step 507. Details are not described herein again.

By using the method, the MME may generate the encryption key and the integrity protection key based on the anchor key and the preset value or the random number that is generated by the MME, thereby implementing security protection for the voice service. Because the MME receives no downlink non-access stratum count, even if the MME is cracked by an attacker, the root key of the AMF node cannot be reversely deduced based on the anchor key, thereby ensuring security of the AMF node.

Figure 7:
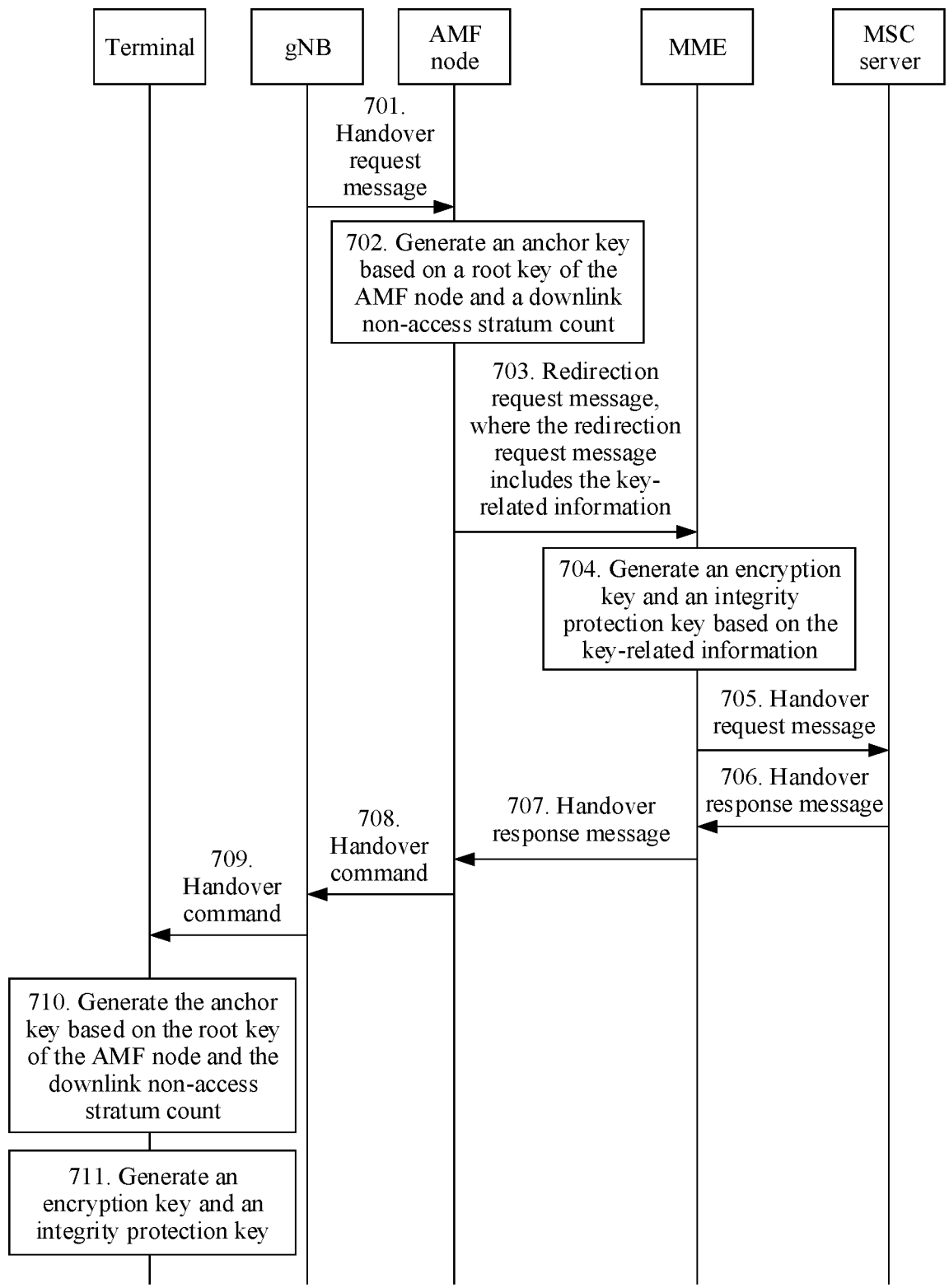
FIG. 7 is a schematic communication diagram of yet another key generation method according to an embodiment of this application.

As shown in FIG. 7, a key generation method provided in an embodiment of this application is described in FIG. 7 with reference to a scenario in which a voice service is handed over from a PS domain to a CS domain. The method includes step 701 to step 711.

Step 701. A gNB sends a handover request (e.g., handover required) message to an AMF node. Correspondingly, the AMF node receives the handover request message.

The gNB may determine, based on a measurement report reported by a terminal, whether a voice service needs to be handed over. If determining, based on the measurement report, that a 5G network signal received by the terminal is relatively weak but a 3G or 2G network signal is relatively strong, the gNB may send the handover request message to the AMF node.

Step 702. The AMF node generates an anchor key based on a root key of the AMF node and a downlink non-access stratum count (DL NAS count).

Optionally, the AMF node may further generate, for an MME, a key deduction parameter used for deducing an encryption key and an integrity key. The key deduction parameter may be a preset value or a random number.

Step 703. The AMF node sends a redirection request (forward relocation request) message to the MME, where the redirection request message includes key-related information. Correspondingly, the MME receives the redirection request message.

The redirection request message includes SRVCC instruction information. The SRVCC instruction information is used to instruct the MME to request, by sending a PS domain to CS domain handover request (PS to CS handover request) message, to hand over the voice service from a PS domain to a CS domain.

The key-related information may include an anchor key, or the key-related information includes an anchor key and a downlink non-access stratum count, or the key-related information includes an anchor key and a preset value, or the key-related information includes an anchor key and a random number.

Optionally, the key-related information may further include a key set identifier and a terminal security capability that are corresponding to the encryption key and the integrity key.

Step 704. The MME generates an encryption key and an integrity protection key based on the key-related information.

The MME generates the encryption key and the integrity protection key based on the key-related information in four possible implementations. Refer to related descriptions in steps 303, 403, 503, and 603 in the foregoing embodiments. Details are not described herein again.

Step 705. The MME sends a handover request message to an MSC server, where the handover request message includes the encryption key and the integrity protection key. Correspondingly, the MSC server receives the handover request message.

The handover request message is used to request to hand over the voice service from the PS domain to the CS domain.

Step 706. The MSC server sends a handover response message to the MME. Correspondingly, the MME receives the handover response message.

The handover response message is a PS domain to CS domain handover response (PS to CS handover response) message.

Step 707. The MME forwards the handover response message to the AMF node. Correspondingly, the AMF node receives the handover response message.

Step 708. The AMF node sends a handover command to the gNB. Correspondingly, the gNB receives the handover command.

The handover command includes a complete downlink non-access stratum count, or includes four least significant bits of a downlink non-access stratum count.

The handover command may further include the first instruction information, the second instruction information, or the third instruction information described in the foregoing embodiments.

Step 709. The gNB forwards the handover command to the terminal. Correspondingly, the terminal receives the handover command.

Step 710. The terminal generates an anchor key based on the root key of the AMF node and the downlink non-access stratum count.

Optionally, if receiving the four least significant bits of the downlink non-access stratum count, the terminal first restores a complete downlink non-access stratum count, and then generates the anchor key based on the root key of the AMF node and the downlink non-access stratum count.

Step 711. The terminal generates an encryption key and an integrity protection key.

This embodiment of this application provides four methods for generating the encryption key and the integrity protection key by the terminal. For details, refer to descriptions in the embodiments corresponding to FIG. 3 to FIG. 6. Details are not described herein again.

Figure 8:
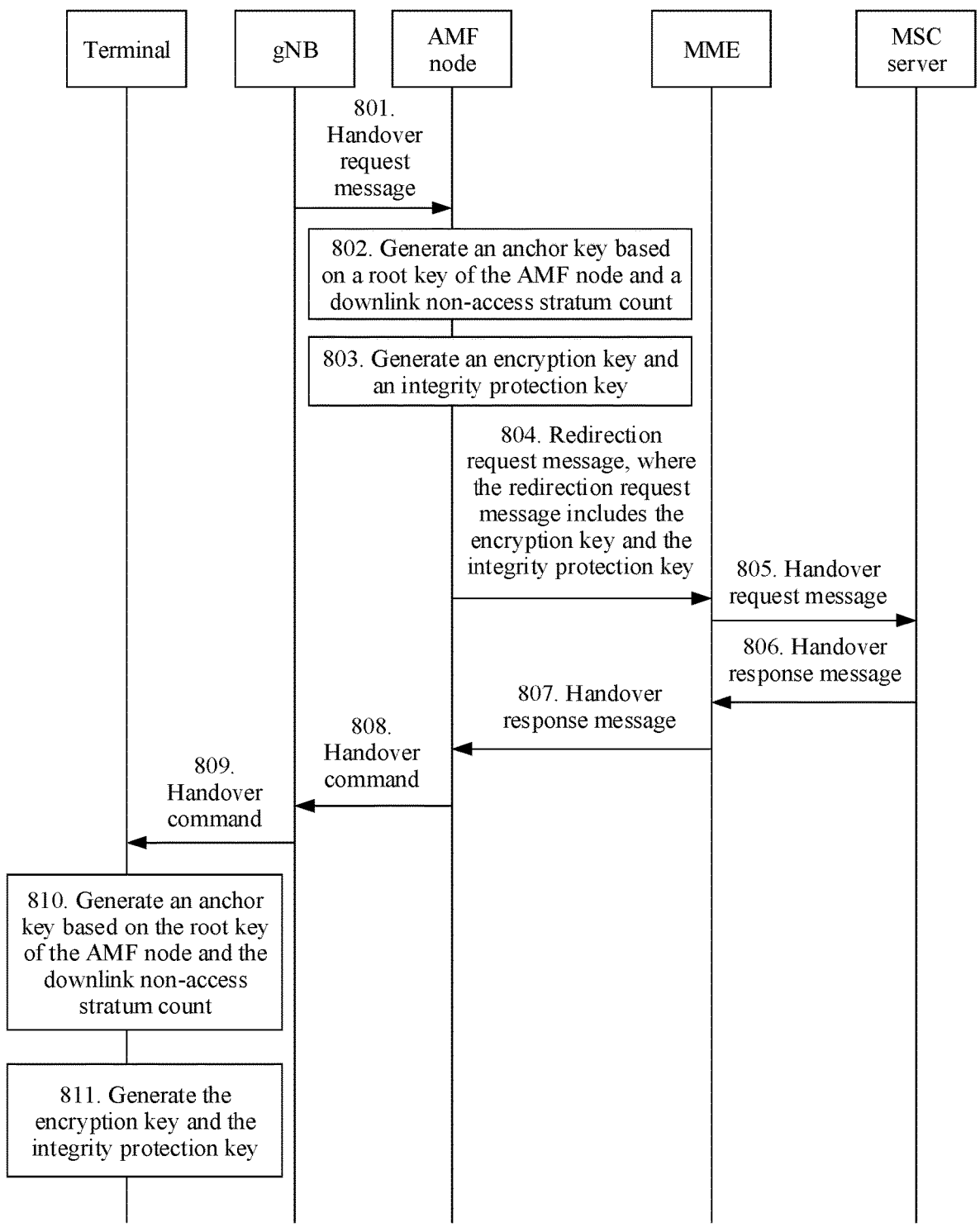
FIG. 8 is a schematic communication diagram of yet another key generation method according to an embodiment of this application.

In the foregoing embodiment, the MME generates the encryption key and the integrity protection key in a process of handing over the voice service from the PS domain to the CS domain. In another possible implementation, alternatively, the AMF node may generate an encryption key and an integrity protection key, and then send the encryption key and the integrity protection key to the MME. As shown in FIG. 8, the method includes step 801 to step 811.

Step 801. A gNB sends a handover request message to an AMF node. Correspondingly, the AMF node receives the handover request message.

Step 802. The AMF node generates an anchor key based on a root key of the AMF node and a downlink non-access stratum count.

Step 803. The AMF node generates an encryption key and an integrity protection key.

The AMF node generates the encryption key and the integrity protection key by using the following three methods:

Method 1: The AMF node determines one part of the anchor key as the encryption key, and determines the other part of the anchor key as the integrity protection key.

The anchor key may include 256 bits. The AMF node may determine the first 128 bits of the anchor key as the encryption key, and determine the last 128 bits of the anchor key as the integrity protection key; or the AMF node determines the first 128 bits of the anchor key as the integrity protection key, and determines the last 128 bits of the anchor key as the encryption key. This is not limited in this embodiment of this application.

Method 2: The AMF node generates the encryption key and the integrity protection key based on the anchor key and the downlink non-access stratum count.

A method for generating, by the AMF node, the encryption key and the integrity protection key based on the anchor key and the downlink non-access stratum count is similar to the method for generating, by the MME, the encryption key and the integrity protection key based on the anchor key and the downlink non-access stratum count. For details, refer to related descriptions in step 403 in FIG. 4. Details are not described herein again.

Method 3: The AMF node generates the encryption key and the integrity protection key based on the anchor key and a preset value, or the AMF node generates the encryption key and the integrity protection key based on the anchor key and a random number.

A method for generating, by the AMF node, the encryption key and the integrity protection key based on the anchor key and the preset value (or based on the anchor key and the random number) is similar to the method for generating, by the MME, the encryption key and the integrity protection key based on the anchor key and the preset value (or based on the anchor key and the random number). For details, refer to descriptions in step 503 in FIG. 5. Details are not described herein again.

Step 804. The AMF node sends a redirection request message to an MME. Correspondingly, the MME receives the redirection request message.

The redirection request message includes the encryption key and the integrity protection key generated by the AMF node.

Step 805. The MME sends a handover request message to an MSC server, where the handover request message includes the encryption key and the integrity protection key. Correspondingly, the MSC server receives the handover request message.

Step 806. The MSC server sends a handover response message to the MME. Correspondingly, the MME receives the handover response message.

Step 807. The MME forwards the handover response message to the AMF node. Correspondingly, the AMF node receives the handover response message.

Step 808. The AMF node sends a handover command to the gNB. Correspondingly, the gNB receives the handover command.

The handover command includes a complete downlink non-access stratum count, or includes four least significant bits of a downlink non-access stratum count.

Optionally, if step 803 is implemented by using the method 2, the handover command further includes first instruction information, where the first instruction information is used to instruct a terminal to generate an encryption key and an integrity protection key based on the downlink non-access stratum count; or if step 803 is implemented by using the method 3, the handover command further includes third instruction information, where the third instruction information includes a preset value or a random number, and the third instruction information is used to instruct a terminal to generate an encryption key and an integrity protection key based on the preset value or the random number.

Step 809. The gNB forwards the handover command to the terminal. Correspondingly, the terminal receives the handover command.

Step 810. The terminal generates an anchor key based on the root key of the AMF node and the downlink non-access stratum count.

Optionally, if receiving the four least significant bits of the downlink non-access stratum count, the terminal first restores a complete downlink non-access stratum count, and then generates the anchor key based on the root key of the AMF node and the downlink non-access stratum count.

Step 811. The terminal generates the encryption key and the integrity protection key.

Optionally, in the method 1 in step 803, the AMF node may negotiate with the terminal in advance on generating the encryption key and the integrity protection key based on the anchor key. Further, after receiving the handover command, the terminal determines one part of the anchor key as the encryption key, and determines the other part of the anchor key as the integrity protection key.

If the handover command received by the terminal includes the first instruction information, the terminal generates the encryption key and the integrity protection key based on the anchor key and the downlink non-access stratum count. A specific method is the same as the method 2 in step 803. Details are not described herein again.

If the handover command received by the terminal includes the third instruction information, the terminal generates the encryption key and the integrity protection key based on the anchor key and the preset value (or based on the anchor key and the random number). A specific method is the same as the method 3 in step 803. Details are not described herein again.

Compared with the prior art in which an MME cannot generate an encryption key or an integrity protection key due to a lack of a certain parameter, in this embodiment of this application, by using the method, the AMF node may generate the encryption key and the integrity protection key, and further send the encryption key and the integrity protection key to the MME. The MME does not need to generate an encryption key or an integrity protection key, but may directly use the received encryption key and integrity protection key, thereby implementing security protection for the voice service.

The solutions provided in the embodiments of the present disclosure are mainly described above from a perspective of interaction between different network elements. It may be understood that, to implement the foregoing functions, the AMF node, the MME, and the terminal include corresponding hardware structures and/or software modules for performing the functions. With reference to the units and algorithm steps described in the embodiments disclosed in the present disclosure, embodiments of the present disclosure can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of the present disclosure.

In the embodiments of the present disclosure, the AMF node, the MME, the terminal, and the like may be divided into functional units based on the foregoing method examples. For example, the functional units may be obtained through division based on corresponding functions, or two or more functions may be integrated into one processing unit. The integrated unit may be implemented in a form of hardware, or may be implemented in a form of a software functional unit. It should be noted that, in the embodiments of the present disclosure, unit division is an example, and is merely logical function division. During actual implementation, another division manner may be used.

Figure 9:
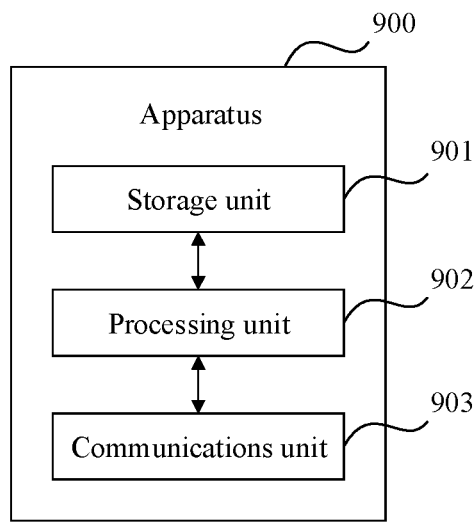
FIG. 9 is a schematic block diagram of an apparatus according to an embodiment of this application.

When an integrated unit is used, FIG. 9 is a schematic block diagram of an apparatus according to an embodiment of the present disclosure. The apparatus may exist in a form of software, or may be an MME or a chip in an MME. The apparatus 900 includes a processing unit 902 and a communications unit 903. The processing unit 902 is configured to control and manage an action of the apparatus 900. For example, the processing unit 902 is configured to support the apparatus 900 in performing step 203 in FIG. 2, step 303 in FIG. 3, step 403 in FIG. 4, step 503 in FIG. 5, step 603 in FIG. 6, step 704 in FIG. 7, and/or another process of the technology described in this specification. The communications unit 903 is configured to support communication between the apparatus 900 and another network element (for example, an AMF node or an MSC server). For example, the communications unit 903 is configured to support the apparatus 900 in performing step 304 in FIG. 3, step 404 in FIG. 4, step 504 in FIG. 5, step 604 in FIG. 6, step 705 and step 707 in FIG. 7, and step 805 and step 807 in FIG. 8. The apparatus 900 may further include a storage unit 901, configured to store program code and data of the apparatus 900.

The processing unit 902 may be a processor or a controller, for example, may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. The processor may be a combination of processors implementing a computing function, for example, a combination of one or more microprocessors, or a combination of a DSP and a microprocessor. The communications unit 903 may be a communications interface. The communications interface is a general term. During implementation, the communications interface may include a plurality of interfaces, for example, may include an interface between an MME and an AMF node, an interface between the MME and an MSC server, and/or another interface. The storage unit 901 may be a memory.

Figure 10:
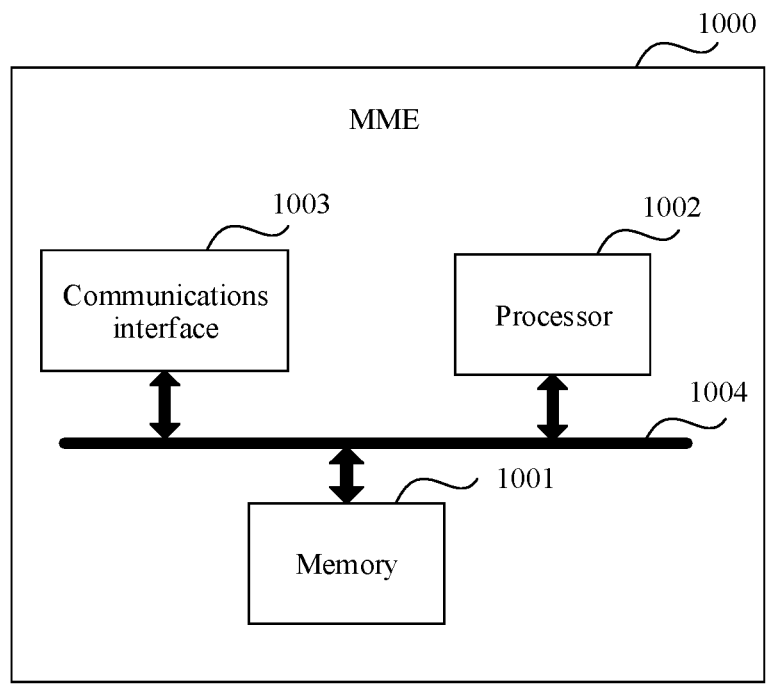
FIG. 10 is a schematic structural diagram of an MME according to an embodiment of this application.

When the processing unit 902 is a processor, the communications unit 903 is a communications interface, and the storage unit 901 is a memory, a structure of the apparatus 900 in this embodiment of this application may be the structure of the MME shown in FIG. 10.

FIG. 10 is a possible schematic structural diagram of an MME according to an embodiment of this application.

Referring to FIG. 10, the MME 1000 includes a processor 1002, a communications interface 1003, and a memory 1001. Optionally, the MME 1000 may further include a bus 1004. The communications interface 1003, the processor 1002, and the memory 1001 may be connected to each other by using the bus 1004. The bus 1004 may be a peripheral component interconnect (PCI) bus, an extended industry standard architecture (EISA) bus, or the like. The bus 1004 may be classified into an address bus, a data bus, a control bus, and the like. For ease of representation, only one thick line is used to represent the bus in FIG. 10, but this does not mean that there is only one bus or only one type of bus.

Figure 11:
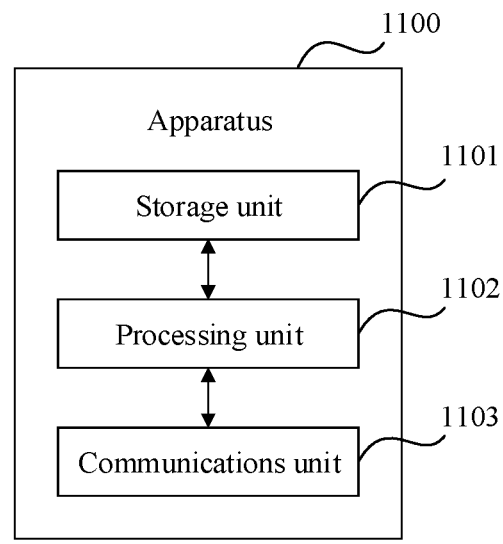
FIG. 11 is a schematic block diagram of another apparatus according to an embodiment of this application.

When an integrated unit is used, FIG. 11 is a schematic block diagram of another apparatus according to an embodiment of the present disclosure. The apparatus may exist in a form of software, or may be an AMF node or a chip in an AMF node. The apparatus 1100 includes a processing unit 1102 and a communications unit 1103. The processing unit 1102 is configured to control and manage an action of the apparatus 1100. For example, the processing unit 1102 is configured to support the apparatus 1100 in performing step 201 in FIG. 2, step 301 in FIG. 3, step 401 in FIG. 4, step 501 in FIG. 5, step 601 in FIG. 6, step 702 in FIG. 7, step 802 and step 803 in FIG. 8, and/or another process of the technology described in this specification. The communications unit 1103 is configured to support communication between the apparatus 1100 and another network element (for example, an MME or a gNB). For example, the communications unit 1103 is configured to support the apparatus 1100 in performing step 202 in FIG. 2, step 302 and step 305 in FIG. 3, step 402 and step 405 in FIG. 4, step 502 and step 505 in FIG. 5, step 602 and step 605 in FIG. 6, step 703 and step 708 in FIG. 7, and step 804 and step 808 in FIG. 8. The apparatus 1100 may further include a storage unit 1101, configured to store program code and data of the apparatus 1100.

The processing unit 1102 may be a processor or a controller, for example, may be a CPU, a general purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the present disclosure. The processor may be a combination of processors implementing a computing function, for example, a combination of one or more microprocessors, or a combination of a DSP and a microprocessor. The communications unit 1103 may be a communications interface. The communications interface is a general term. During implementation, the communications interface may include a plurality of interfaces, for example, may include an interface between an AMF node and an MME, an interface between the AMF node and a gNB, and/or another interface. The storage unit 1101 may be a memory.

Figure 12:
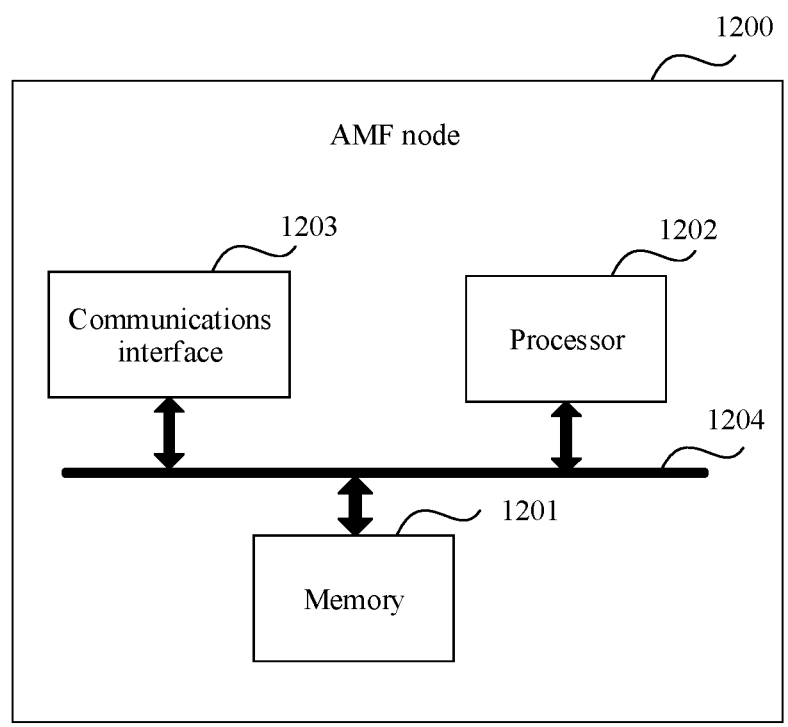
FIG. 12 is a schematic structural diagram of an AMF node according to an embodiment of this application.

When the processing unit 1102 is a processor, the communications unit 1103 is a communications interface, and the storage unit 1101 is a memory, a structure of the apparatus 1100 in this embodiment of this application may be the structure of the AMF node shown in FIG. 12.

FIG. 12 is a possible schematic structural diagram of an AMF node according to an embodiment of this application.

Referring to FIG. 12, the AMF node 1200 includes a processor 1202, a communications interface 1203, and a memory 1201. Optionally, the AMF node 1200 may further include a bus 1204. The communications interface 1203, the processor 1202, and the memory 1201 may be connected to each other by using the bus 1204. The bus 1204 may be a PCI bus, an EISA bus, or the like. The bus 1204 may be classified into an address bus, a data bus, a control bus, and the like. For ease of representation, only one thick line is used to represent the bus in FIG. 12, but this does not mean that there is only one bus or only one type of bus.

Figure 13:
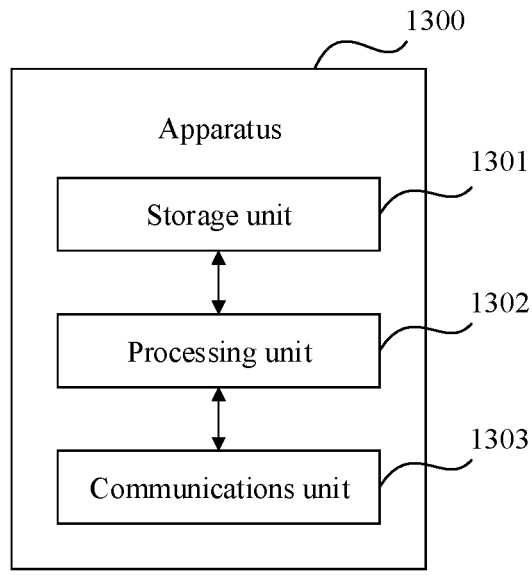
FIG. 13 is a schematic block diagram of still another apparatus according to an embodiment of this application.

When an integrated unit is used, FIG. 13 is a schematic block diagram of still another apparatus according to an embodiment of the present disclosure. An apparatus 1300 may exist in a form of software, or may be a terminal or a chip in a terminal. The apparatus 1300 includes a processing unit 1302 and a communications unit 1303. The processing unit 1302 is configured to control and manage an action of the apparatus 1300. For example, the processing unit 1302 is configured to support the apparatus 1300 in performing step 306 to step 308 in FIG. 3, step 406 to step 408 in FIG. 4, step 506 to step 508 in FIG. 5, step 606 to step 608 in FIG. 6, step 710 and step 711 in FIG. 7, step 810 and step 811 in FIG. 8, and/or another process of the technology described in this specification. The communications unit 1303 is configured to support communication between the apparatus 1300 and another network element (for example, a gNB). The apparatus 1300 may further include a storage unit 1301, configured to store program code and data of the apparatus 1300.

The processing unit 1302 may be a processor or a controller, for example, may be a CPU, a general purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the present disclosure. The processor may be a combination of processors implementing a computing function, for example, a combination of one or more microprocessors, or a combination of a DSP and a microprocessor. The communications unit 1303 may be a transceiver, a transceiver circuit, a communications interface, or the like. The storage unit 1301 may be a memory.

Figure 14:
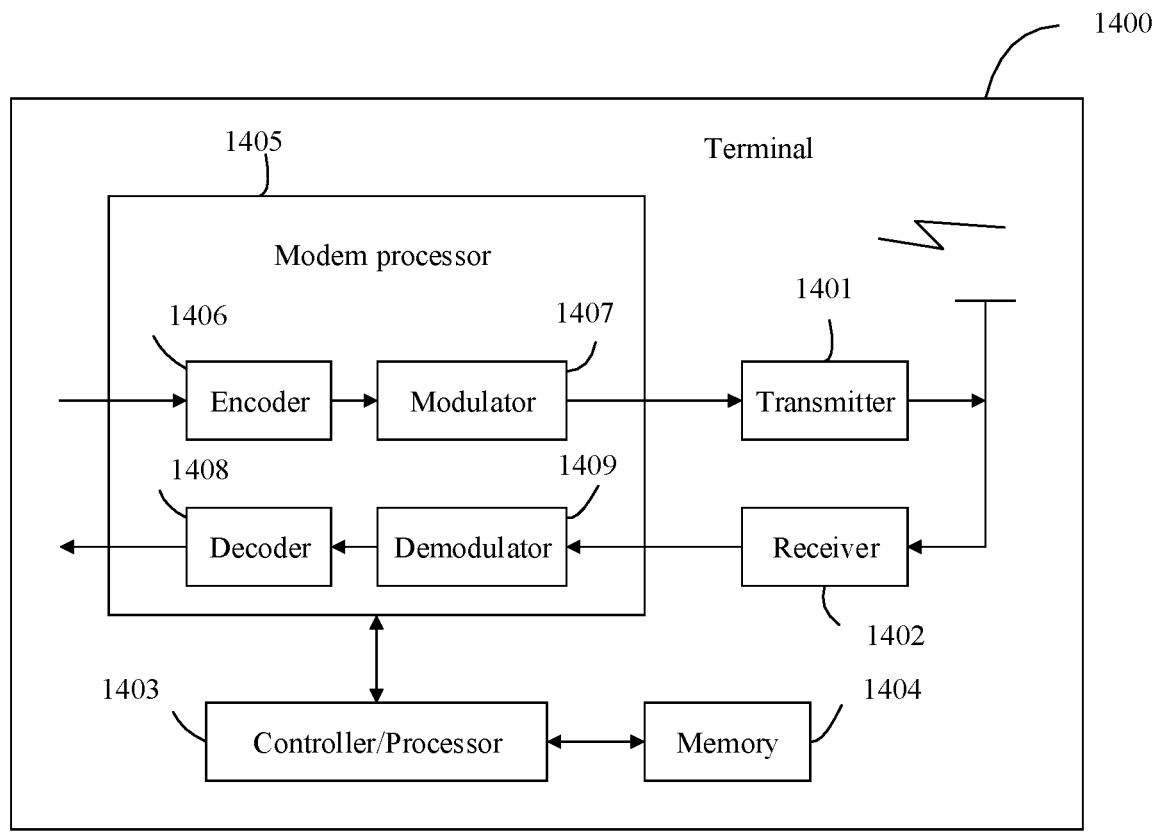
FIG. 14 is a schematic structural diagram of a terminal according to an embodiment of this application.

When the processing unit 1302 is a processor, the communications unit 1303 is a transceiver, and the storage unit 1301 is a memory, the apparatus 1300 in this embodiment of this application may be the terminal shown in FIG. 14.

FIG. 14 is a simplified schematic diagram of a terminal according to an embodiment of this application. The terminal 1400 includes a transmitter 1401, a receiver 1402, and a processor 1403. The processor 1403 may alternatively be a controller, and is represented as a "controller/processor 1403" in FIG. 14. Optionally, the terminal 1400 may further include a modem processor 1405. The modem processor 1405 may include an encoder 1406, a modulator 1407, a decoder 1408, and a demodulator 1409.

In an example, the transmitter 1401 adjusts (for example, performs analog conversion, filtering, amplification, and up-conversion on) the output sample and generates an uplink signal, where the uplink signal is transmitted to the base station in the foregoing embodiment by using an antenna. In a downlink, the antenna receives the downlink signal transmitted by the base station in the foregoing embodiment. The receiver 1402 adjusts (for example, performs filtering, amplification, down-conversion, and digitization on) a signal received from the antenna and provides an input sample. In the modem processor 1405, the encoder 1406 receives service data and a signaling message that are to be sent on an uplink, and processes (for example, formats, encodes, and interleaves) the service data and the signaling message. The modulator 1407 further processes (for example, performs symbol mapping and modulation on) the encoded service data and signaling message and provides an output sample. The demodulator 1409 processes (for example, demodulates) the input sampling and provides symbol estimation. The decoder 1408 processes (for example, de-interleaves and decodes) the symbol estimation and provides decoded data and a decoded signaling message that are to be sent to the terminal 1400. The encoder 1406, the modulator 1407, the demodulator 1409, and the decoder 1408 may be implemented by the combined modem processor 1405. These units perform processing based on a radio access technology (for example, an access technology of an LTE system or another evolved system) used by a radio access network. It should be noted that when the terminal 1400 does not include the modem processor 1405, the foregoing functions of the modem processor 1405 may alternatively be completed by the processor 1403.

The processor 1403 controls and manages an action of the terminal 1400, and is configured to perform processing processes performed by the terminal 1400 in the foregoing embodiments of the present disclosure. For example, the processor 1403 is further configured to perform the processing processes of the terminal in the methods shown FIG. 3 to FIG. 8 and/or another process of the technical solutions described in this application.

Further, the terminal 1400 may further include a memory 1404. The memory 1404 is configured to store program code and data of the terminal 1400.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in an MME, an AMF node, or a terminal. Certainly, the processor and the storage medium may exist in an MME, an AMF node, or a terminal as discrete components.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, the functional units in the embodiments of the present disclosure may be integrated into one processing unit, or each of the functional units may exist independently, or two or more units are integrated into one unit. The integrated unit may be implemented in a form of hardware, or may be implemented in a form of hardware and a software functional unit.

Based on the foregoing descriptions of the implementations, a person skilled in the art may clearly understand that this application may be implemented by software and universal hardware or by hardware only. In most cases, the former is a preferred implementation. Based on such understanding, the technical solutions of this application essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A key generation method, comprising:
receiving, by a mobility management entity, a redirection request message from an access and mobility management function node, wherein the redirection request message comprises key-related information, and the redirection request message is used to request to hand over a voice service from a packet switched (PS) domain to a circuit switched (CS) domain; and
generating, by the mobility management entity, an encryption key and an integrity protection key based on the key-related information.

2. The method according to claim 1, wherein the key-related information comprises an anchor key and a downlink non-access stratum count, and the generating of the encryption key and the integrity protection key, comprises:
generating, by the mobility management entity, the encryption key and the integrity protection key based on the anchor key and the downlink non-access stratum count.

3. The method according to claim 2, further comprising:
sending, by the mobility management entity, first instruction information to the access and mobility management function node;
sending, by the access and mobility management function node, the first instruction information to a terminal to instruct the terminal to generate the encryption key and the integrity protection key based on a downlink non-access stratum count.

4. The method according to claim 1, wherein the key-related information comprises an anchor key, and the generating of the encryption key and the integrity protection key, comprises:
generating, by the mobility management entity, the encryption key and the integrity protection key based on the anchor key and a preset value.

5. The method according to claim 4, further comprising:
sending, by the mobility management entity, second instruction information to the access and mobility management function node,
wherein the second instruction information comprises the preset value or the random number;
sending, by the access and mobility management function node, the second instruction information to a terminal to instruct the terminal to generate the encryption key and the integrity protection key based on the preset value or the random number.

6. The method according to claim 4, wherein the generating the encryption key and the integrity protection key based on the anchor key and a preset value comprises:
generating a new key $K_{ASME}'$ based on the anchor key and the preset value, wherein a part of the new key $K_{ASME}'$ is used as the encryption key, and the other part of $K_{ASME}'$ is used as the integrity protection key.

7. The method according to claim 6, wherein the first 128 bits of the new key $K_{ASME}'$ is used as the encryption key, and the last 128 bits of the new key $K_{ASME}'$ is used as the integrity protection key.

8. The method according to claim 1, further comprising:
sending, by the mobility management entity, a handover request message to a mobile switching center (MSC) server, wherein the handover request message comprising the encryption key and the integrity protection key.

9. A key generation method, comprising:
determining, by an access and mobility management function node, key-related information, wherein the key-related information is used to generate an encryption key and an integrity protection key; and
sending, by the access and mobility management function node, a redirection request message to a mobility management entity,
wherein the redirection request message comprises the key-related information, and the redirection request message is used to request to hand over a voice service from a packet switched (PS) domain to a circuit switched (CS) domain.

10. The method according to claim 9, wherein the key-related information comprises an anchor key and a downlink non-access stratum count, and the method further comprises:
generating, by the access and mobility management function node, first instruction information, or receiving first instruction information from the mobility management entity; and
sending, by the access and mobility management function node, the first instruction information to a terminal,
wherein the first instruction information is used to instruct the terminal to generate the encryption key and the integrity protection key based on the downlink non-access stratum count.

11. The method according to claim 9, wherein the key-related information comprises an anchor key, and the method further comprises:
receiving, by the access and mobility management function node, second instruction information from the mobility management entity, wherein the second instruction information comprises a preset value or a random number, and the second instruction information is used to instruct a terminal to generate the encryption key and the integrity protection key based on the preset value or the random number; and
sending, by the access and mobility management function node, the second instruction information to the terminal.

12. The method according to claim 9, wherein the key-related information comprises an anchor key and a preset value, or the key-related information comprises an anchor key or a random number; the method further comprises:
sending, by the access and mobility management function node, third instruction information to a terminal, wherein the third instruction information comprises the preset value or the random number, and the third instruction information is used to instruct the terminal to generate the encryption key and the integrity protection key based on the preset value or the random number.

13. The method according to claim 9, wherein the key-related information comprises an anchor key, and the determining the key-related information comprises:
generating, by the access and mobility management function node, the anchor key based on a root key of the access and mobility management function node and a downlink non-access stratum count.

14. An apparatus, comprising:
a processor; and
a memory having instructions stored thereon that, when executed by the processor, cause the apparatus to:
receive a redirection request message from an access and mobility management function node, wherein the redirection request message comprises key-related information, and the redirection request message is used to request to hand over a voice service from a packet switched (PS) domain to a circuit switched (CS) domain; and
generate an encryption key and an integrity protection key based on the key-related information.

15. The apparatus according to claim 14, wherein the key-related information comprises an anchor key and a downlink non-access stratum count; and the apparatus is caused to:
generate the encryption key and the integrity protection key based on the anchor key and the downlink non-access stratum count.

16. The apparatus according to claim 14, wherein the apparatus is further caused to:
send first instruction information to the access and mobility management function node, wherein the first instruction information is used to instruct a terminal to generate the encryption key and the integrity protection key based on a downlink non-access stratum count.

17. The apparatus according to claim 14, wherein the key-related information comprises an anchor key; and the apparatus is caused to:
generate the encryption key and the integrity protection key based on the anchor key and a preset value.

18. The apparatus according to claim 17, wherein the apparatus is caused to:
send second instruction information to the access and mobility management function node,
wherein the second instruction information comprises the preset value or the random number, and the second instruction information is used to instruct a terminal to generate the encryption key and the integrity protection key based on the preset value or the random number.

19. The apparatus according to claim 17, wherein the apparatus is mobility management entity.

20. The apparatus according to claim 17, wherein the apparatus is caused to:
generate a new key $K_{ASME}'$ based on the anchor key and the preset value; wherein a part of the new key $K_{ASME}'$ is used as the encryption key, and the other part of $K_{ASME}'$ is used as the integrity protection key.

21. The apparatus according to claim 20, wherein the first 128 bits of the new key $K_{ASME}'$ is used as the encryption key, and the last 128 bits of the new key $K_{ASME}'$ is used as the integrity protection key.

22. The apparatus according to claim 14, wherein the apparatus is further caused to:
send a handover request message to a mobile switching center (MSC) server, wherein the handover request message comprising the encryption key and the integrity protection key.

23. An apparatus, comprising:
a processor; and
a memory having instructions stored thereon that, when executed by the processor, cause the apparatus to:
determine key-related information, wherein the key-related information is used to generate an encryption key and an integrity protection key; and
send a redirection request message to a mobility management entity,
wherein the redirection request message comprises the key-related information, and the redirection request message is used to request to hand over a voice service from a packet switched (PS) domain to a circuit switched (CS) domain.

24. The apparatus according to claim 23, wherein the key-related information comprises an anchor key, and the apparatus is caused to:
generate the anchor key based on a root key of the access and mobility management function node and a downlink non-access stratum count.

25. The apparatus according to claim 23, wherein the redirection request message includes single radio voice call continuity (SRVCC) instruction information used to instruct the mobility management entity to request, by sending a handover request message, to hand over the voice service from the PS domain to the CS domain.

* * * * *